(12) United States Patent
Tyercha et al.

(10) Patent No.: US 9,720,931 B2
(45) Date of Patent: Aug. 1, 2017

(54) QUERYING SPATIAL DATA IN COLUMN STORES USING GRID-ORDER SCANS

(71) Applicants: Edward-Robert Tyercha, Heidelberg (DE); Gerrit Simon Kazmaier, Heidelberg (DE); Hinnerk Gildhoff, Heidelberg (DE); Isil Pekel, Heidelberg (DE); Lars Volker, Karlsruhe (DE); Tim Grouisborn, Mannheim (DE)

(72) Inventors: Edward-Robert Tyercha, Heidelberg (DE); Gerrit Simon Kazmaier, Heidelberg (DE); Hinnerk Gildhoff, Heidelberg (DE); Isil Pekel, Heidelberg (DE); Lars Volker, Karlsruhe (DE); Tim Grouisborn, Mannheim (DE)

(73) Assignee: SAP SE, Walldorf (DE)

( * ) Notice: Subject to any disclaimer, the term of this patent is extended or adjusted under 35 U.S.C. 154(b) by 206 days.

(21) Appl. No.: 14/274,548

(22) Filed: May 9, 2014

(65) Prior Publication Data
US 2015/0324373 A1    Nov. 12, 2015

(51) Int. Cl.
*G06F 7/00*      (2006.01)
*G06F 17/30*     (2006.01)

(52) U.S. Cl.
CPC .... *G06F 17/30241* (2013.01); *G06F 17/3087* (2013.01); *G06F 17/30315* (2013.01); *G06F 17/30917* (2013.01)

(58) Field of Classification Search
CPC .......... G06F 17/3087; G06F 17/30315; G06F 17/30917; G06F 17/30241
USPC ......................................... 707/714, 722, 792
See application file for complete search history.

(56) References Cited

U.S. PATENT DOCUMENTS

| | | | |
|---|---|---|---|
| 6,021,406 A * | 2/2000 | Kuznetsov | ........ G06F 17/30259 |
| 2006/0106833 A1 | 5/2006 | Chen et al. | |
| 2006/0184519 A1 | 8/2006 | Smartt | |
| 2008/0052303 A1 | 2/2008 | Adler et al. | |
| 2008/0086464 A1 | 4/2008 | Enga | |
| 2008/0162424 A1 | 7/2008 | Adler | |
| 2010/0088309 A1* | 4/2010 | Petculescu | .......... G06F 17/3048 |
| | | | 707/714 |
| 2011/0316855 A1 | 12/2011 | Mejdrich et al. | |
| 2012/0116678 A1 | 5/2012 | Witmer | |
| 2012/0179690 A1 | 7/2012 | Wheeler et al. | |
| 2015/0310047 A1* | 10/2015 | Zhou | ................ G06F 17/30333 |
| | | | 707/737 |
| 2015/0324399 A1 | 11/2015 | Tyercha et al. | |

* cited by examiner

*Primary Examiner* — Md. I Uddin
(74) *Attorney, Agent, or Firm* — Mintz Levin Cohn Ferris Glovsky and Popeo, P.C.

(57) ABSTRACT

A query of spatial data is received by a database comprising a columnar data store storing data in a column-oriented structure. Thereafter, a minimal bounding rectangle associated with the query is identified using a grid order scanning technique. The spatial data set corresponding to the received query is then mapped to physical storage in the database using the identified minimal bounding rectangle so that the spatial data set can be retrieved. Related apparatus, systems, techniques and articles are also described.

18 Claims, 24 Drawing Sheets

| Descriptor | $l_x$ | $l_y$ | $u_x$ | $u_y$ |
|---|---|---|---|---|
| $B_1$ | 6.2 | 2.1 | 8.0 | 3.0 |
| $B_2$ | 5.1 | 5.5 | 5.9 | 6.3 |
| $B_3$ | 6.1 | 5.4 | 7.8 | 6.5 |
| $B_4$ | 6.5 | 4.5 | 7.4 | 5.4 |
| $B_5$ | 0.5 | 2.6 | 2.7 | 4.5 |
| $B_6$ | 2.1 | 0.4 | 3.3 | 2.0 |
| $B_7$ | 1.8 | 2.9 | 1.4 | 3.3 |

300

| $D_x$ | | $D_y$ | |
|---|---|---|---|
| ValID | $l_x$ | ValID | $l_x$ |
| 0 | 0.5 | 0 | 0.4 |
| 1 | 1.4 | 1 | 2.0 |
| 2 | 1.8 | 2 | 2.1 |
| 3 | 2.1 | 3 | 2.6 |
| 4 | 2.7 | 4 | 2.9 |
| 5 | 3.3 | 5 | 3.0 |
| 6 | 5.1 | 6 | 3.3 |
| 7 | 5.9 | 7 | 4.5 |
| 8 | 6.1 | 8 | 5.4 |
| 9 | 6.2 | 9 | 5.5 |
| 10 | 6.5 | 10 | 6.3 |
| 11 | 7.4 | 11 | 6.5 |
| 12 | 7.8 | | |
| 13 | 8.0 | | |

| | $I_{l_x}$ | $I_{l_y}$ | $I_{u_x}$ | $I_{u_y}$ |
|---|---|---|---|---|
| $B_1$ | 9 | 2 | 13 | 5 |
| $B_2$ | 6 | 9 | 7 | 10 |
| $B_3$ | 8 | 8 | 12 | 11 |
| $B_4$ | 10 | 7 | 11 | 8 |
| $B_5$ | 0 | 3 | 4 | 7 |
| $B_6$ | 3 | 0 | 5 | 1 |
| $B_7$ | 2 | 4 | 1 | 6 |

FIG. 7

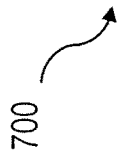

Algorithm 1: Pseudo code for the non-parallel scanning of an index vector for a given value ID.

Data: $I$ is the index vector that should be scanned. $v$ is the integer value ID. $o$ is the boolean operator (e.g., $\leq, >, ==$). $i_{from}$ and $i_{to}$ is the range that should be scanned in $I$. $r$ is the resulting bit vector of the same size as $I$. We assume $r$ and $I$ have the same size.

1  IndexScan($I, v, o, i_{from}, i_{to}, r$):
2    for $i \leftarrow i_{from}$ to $i_{to}$ do
3      $r[i] \leftarrow$ apply operator $o$ on $I[i]$ with $v$
      /* example:  $r[i] \leftarrow I[i] \leq v$  */

FIG. 8

Algorithm 2: Pseudo code for performing the filter step of the equals-query for a given mesh and its bounding box.

Data: $l_x, l_y, u_x, u_y$ are the lower left and upper right coordinates of the given bounding box $Q$. $r$ is the resulting bit vector. $I_{l_x}, I_{l_y}, I_{u_x}, I_{u_y}$ are the unsorted index vectors and $D_x, D_y$ are the sorted dictionaries of the column.

1 value ID $v_{l_x} \leftarrow$ binary search for $l_x$ in $D_x$
2 value ID $v_{u_x} \leftarrow$ binary search for $u_x$ in $D_x$
3 value ID $v_{l_y} \leftarrow$ binary search for $l_y$ in $D_y$
4 value ID $v_{u_y} \leftarrow$ binary search for $u_y$ in $D_y$
5 if *at least one of value IDs not found* then
6     return *empty* $r$
7 $n \leftarrow$ length of $I_{l_x}$
8 $IndexScan(I_{l_x}, v_{l_x}, ==, 0, n-1, r_{l_x})$
9 $IndexScan(I_{l_y}, v_{l_y}, ==, 0, n-1, r_{l_y})$
10 $IndexScan(I_{u_x}, v_{u_x}, ==, 0, n-1, r_{u_x})$
11 $IndexScan(I_{u_y}, v_{u_y}, ==, 0, n-1, r_{u_y})$
12 $r \leftarrow r_{l_x} \& r_{l_y} \& r_{u_x} \& r_{u_y}$

FIG. 10

Algorithm 3: Pseudo code for performing the filter step of the intersects-query for a given mesh and its bounding box.

Data: $l_x, l_y, u_x, u_y$ are the lower left and upper right coordinates of the given bounding box. $r$ is the resulting bit vector. $I_{l_x}, I_{l_y}, I_{u_x}, I_{u_y}, D_x, D_y$ are the known index vectors and the dictionaries of the column.

```
   /* for the x-axis                                                    */
 1 value ID v_{l_x} ← min(D_x)
 2 value ID v_{u_x} ← max(D_x)
 3 value ID templ ← binary search for l_x or next smaller value in D_x
 4 value ID tempu ← binary search for u_x or next larger number in D_x
 5 value ID v_{l_x} ← max(v_{l_x}, templ)
 6 value ID v_{u_x} ← min(v_{u_x}, tempu)
   /* do the same for the y-axis                                        */
 7 ...
 8 n ← length of I_{l_x}
 9 IndexScan(I_{l_x}, v_{u_x}, ≤, 0, n − 1, r_{l_x})
10 IndexScan(I_{l_y}, v_{u_y}, ≤, 0, n − 1, r_{l_y})
11 IndexScan(I_{u_x}, v_{l_x}, ≥, 0, n − 1, r_{u_x})
12 IndexScan(I_{u_y}, v_{l_y}, ≥, 0, n − 1, r_{u_y})
13 r ← r_{l_x} & r_{l_y} & r_{u_x} & r_{u_y}
```

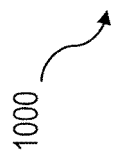
1000

FIG. 11

Algorithm 4: Pseudo code for performing the filter step of the inside-query for a given mesh and its bounding box.

Data: $l_x, l_y, u_x, u_y$ are the lower left and upper right coordinates of the given bounding box. $r$ is the resulting bit vector. $I_{l_x}, I_{l_y}, I_{u_x}, I_{u_y}, D_x, D_y$ are the known index vectors and the dictionaries of the column.

```
/* Extract from the dictionaries D_x, D_y the value IDs
   v_{l_x}, v_{l_y}, v_{u_x}, v_{u_y} the same way as with the intersect-query  */
1  n ← length of I_{l_x}
2  IndexScan(I_{l_x}, v_{l_x}, ≥, 0, n − 1, r_{l_x})
3  IndexScan(I_{l_y}, v_{l_y}, ≥, 0, n − 1, r_{l_y})
4  IndexScan(I_{u_x}, v_{u_x}, ≤, 0, n − 1, r_{u_x})
5  IndexScan(I_{u_y}, v_{u_y}, ≤, 0, n − 1, r_{u_y})
6  r ← r_{l_x} & r_{l_y} & r_{u_x} & r_{u_y}
```

FIG. 13
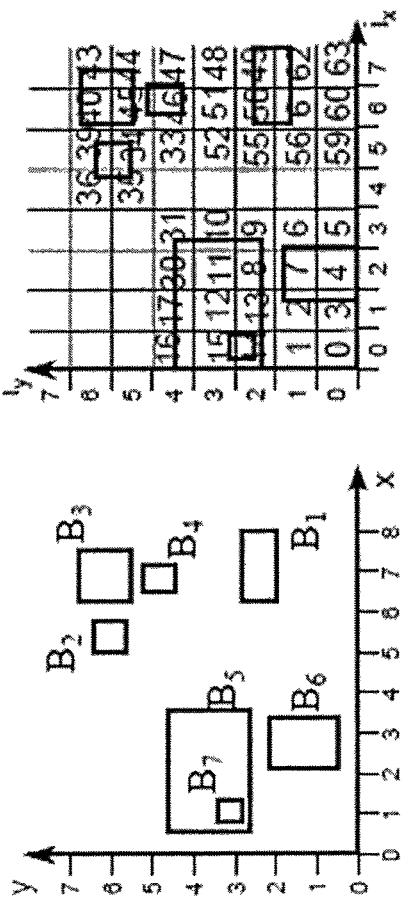
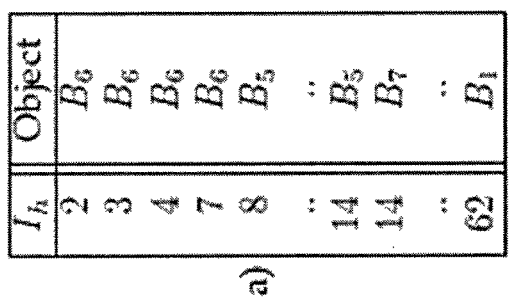

FIG. 16

| |
|---|
| Algorithm 5: Pseudo code for the insert process of a set of bounding boxes with the single-storage technique. |
| Data: $\mathbb{B}$ is a set of bounding boxes. |
| 1  $Temp \leftarrow \emptyset$ { table structure with four columns, $l_x, l_y, u_x, u_y$ } |
| 2  foreach $B \in \mathbb{B}$ do |
| 3  $\quad Temp \leftarrow Temp \cup (B.ll.x, B.ll.y, B.ur.x, B.ur.y)$ |
| 4  $D_x \leftarrow$ dictionary encode $l_x$ and $u_x$ of $Temp$. |
| 5  $D_y \leftarrow$ dictionary encode $l_y$ and $u_y$ of $Temp$. |
| 6  create index vector $I_{l_x}$ from $l_x$ of $Temp$ using $D_x$ |
| 7  create index vector $I_{u_x}$ from $u_x$ of $Temp$ using $D_x$ |
| 8  create index vector $I_{l_y}$ from $l_y$ of $Temp$ using $D_y$ |
| 9  create index vector $I_{u_y}$ from $u_y$ of $Temp$ using $D_y$ |
| 10  $I_h \leftarrow \emptyset$ { vector storing $h_{grid}$} |
| 11  foreach $B \in \mathbb{B}$ do |
| 12  $\quad I_h \leftarrow I_h \cup (h_{grid}(B))$ { use $D_x$ and $D_y$ for space boundary} |
| 13  reorder $I_{l_x}, I_{l_y}, I_{u_x}, I_{u_y}$ based on $I_h$ |

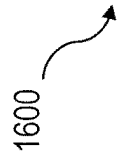

FIG. 17

Algorithm 6: Pseudo code for computing the Grid-Order $h_{grid}$ using single-storage.

Data: $B$ is the bounding box for which $h_{grid}$ should be computed. $D_x, D_y$ are the two dictionaries from the Shared-ADM. *cellaxiscount* describes the number of subdivisions. $k$ is the number of adjacent cells.

1   $x_{min}, x_{max} \leftarrow min(D_x), max(D_x)$
2   $y_{min}, y_{max} \leftarrow min(D_y), max(D_y)$
3   $cellsize \leftarrow max(x_{max} - x_{min}, y_{max} - y_{min})/cellaxiscount$
4   $i_{l_x} \leftarrow \lfloor (B.ll.x - x_{min})/cellsize \rfloor$
5   $i_{u_x} \leftarrow \lfloor (B.ur.x - x_{min})/cellsize \rfloor$
6   $i_{l_y} \leftarrow \lfloor (B.ll.y - y_{min})/cellsize \rfloor$
7   $i_{u_y} \leftarrow \lfloor (B.ur.y - y_{min})/cellsize \rfloor$
8   if $i_{u_x} - i_{l_x} > k$ or $i_{u_y} - i_{l_y} > k$ then
9     return $h_{grid} \leftarrow -1$ { return exclusive overflow cell id, here $-1$ }
10   else
11     return $h_{grid} \leftarrow h(i_{l_x}, i_{l_y})$ { compute Hilbert distance $h$ using *cellaxiscount* as order for the cell where $B.ll$ is assigned to }

Algorithm 7: Pseudo code for performing the filter step of the intersects-query with the single-storage technique.

Data: $l_x, l_y, u_x, u_y$ are the lower left and upper right coordinates of the given bounding box. $r$ is the resulting bit vector. $I_{l_x}, I_{l_y}, I_{u_x}, I_{u_y}, D_x, D_y$ are the known sorted index vectors and the dictionaries of the column. $I_h$ is the sorted vector storing the Grid-Order. *cellsize* is the value used for computing all $h_{grid}$ values in Algorithm 6. $k$ is the number of adjacent cells.

1  $x_{min}, x_{max} \leftarrow min(D_x), max(D_x)$
2  $y_{min}, y_{max} \leftarrow min(D_y), max(D_y)$
3  $i_{l_x} \leftarrow \lfloor (l_x - x_{min})/cellsize \rfloor - (k-1)$
4  $i_{u_x} \leftarrow \lfloor (u_x - x_{min})/cellsize \rfloor$
5  $i_{l_y} \leftarrow \lfloor (l_y - y_{min})/cellsize \rfloor - (k-1)$
6  $i_{u_y} \leftarrow \lfloor (u_y - y_{min})/cellsize \rfloor$
7  $h_{min} \leftarrow min(I_h)$
8  $h_{max} \leftarrow max(I_h)$
9  for $i_y \leftarrow i_{l_y}$ to $i_{u_y}$ do
10    for $i_x \leftarrow i_{l_x}$ to $i_{u_x}$ do
11       $h \leftarrow$ compute Hilbert distance $h(i_x, i_y)$ of order *cellsize*
12       update $h_{min}$ and $h_{max}$ depending on $h$
13  $n_{start} \leftarrow$ binary search of $h_{min}$ in $I_h$ for the first occurrence's position.
14  $n_{end} \leftarrow$ binary search of $h_{max}$ in $I_h$ for the last occurrence's position.
15  $n_{overflow} \leftarrow$ binary search of $-1$ in $I_h$ for the last occurrence's position.
16  $IndexScan(I_{l_x}, v_{l_x}, \geq, n_{start}, n_{end}, r_{l_x})$
17  $IndexScan(I_{l_y}, v_{l_y}, \geq, n_{start}, n_{end}, r_{l_y})$
18  $IndexScan(I_{u_x}, v_{u_x}, \leq, n_{start}, n_{end}, r_{u_x})$
19  $IndexScan(I_{u_y}, v_{u_y}, \leq, n_{start}, n_{end}, r_{u_y})$
20  $IndexScan(I_{l_x}, v_{l_x}, \geq, 0, n_{overflow}, r_{l_x})$
21  $IndexScan(I_{l_y}, v_{l_y}, \geq, 0, n_{overflow}, r_{l_y})$
22  $IndexScan(I_{u_x}, v_{u_x}, \leq, 0, n_{overflow}, r_{u_x})$
23  $IndexScan(I_{u_y}, v_{u_y}, \leq, 0, n_{overflow}, r_{u_y})$
24  $r \leftarrow r_{l_x} \& r_{l_y} \& r_{u_x} \& r_{u_y}$

FIG. 18

Algorithm 8: Pseudo code for computing the Grid-Tree-Order $h_{tree}$.

Data: $B$ is the bounding box for which $h_{tree}$ should be computed. $D_x, D_y$ are the two dictionaries from the Shared-ADM. $cellaxiscount$ describes the number of subdivisions per axis. $c$ is the number of cells per node. $d_{max}$ is the maximum depth.

1  $x_{min}, x_{max} \leftarrow min(D_x), max(D_x)$
2  $y_{min}, y_{max} \leftarrow min(D_y), max(D_y)$
3  $cellsize \leftarrow max(x_{max} - x_{min}, y_{max} - y_{min})/cellaxiscount^{d_{max}}$ 4  $i_{l_x} \leftarrow \lfloor (B.ll.x - x_{min})/cellsize \rfloor$
5  $i_{u_x} \leftarrow \lfloor (B.ur.x - x_{min})/cellsize \rfloor$
6  $i_{l_y} \leftarrow \lfloor (B.ll.y - y_{min})/cellsize \rfloor$
7  $i_{u_y} \leftarrow \lfloor (B.ur.y - y_{min})/cellsize \rfloor$ 8  $b \leftarrow \lceil log_2(cellaxiscount) \rceil$ { bits required to encode the cells per axis }
9  $bitmask \leftarrow 2^b - 1$
10 $d_{fit} \leftarrow min\{d \in \{0, 1, ..., d_{max}\} : i_{l_x} \gg d == i_{u_x} \gg d \land i_{l_y} \gg d == i_{u_y} \gg d\}$
11 $h_{tree} \leftarrow 0$
12 for $d = 0$ to $d_{fit}$ do
13 $\quad ti_{l_x} \leftarrow (i_{l_x} \gg (d_{max} - d))$ & $bitmask$
14 $\quad ti_{l_y} \leftarrow (i_{l_y} \gg (d_{max} - d))$ & $bitmask$
15 $\quad q \leftarrow$ bit interleave $ti_{l_x}$ and $ti_{l_y}$ for Z-order
16 $\quad a \leftarrow N_c(d_{max} - d)$ { see equation 4.1 }
17 $\quad h_{tree} \leftarrow h_{tree} + a \cdot q$
18 if $d_{fit} \neq d_{max}$ then
19 $\quad a \leftarrow N_c(d_{max} - d_{fit} - 1)$
20 $\quad h_{tree} \leftarrow h_{tree} + a \cdot c$
21 return $h_{tree}$

FIG. 19

Algorithm 9: Pseudo code for performing the filter step of the intersects-query with the Grid-Tree-Order $h_{tree}$.

Data: $l_x, l_y, u_x, u_y$ are the lower left and upper right coordinates of the given bounding box. $r$ is the resulting bit vector. $I_{l_x}, I_{l_y}, I_{u_x}, I_{u_y}, D_x, D_y$ are the known sorted index vectors and the dictionaries of the column. $I_h$ is the sorted vector storing the TreeGrid-Order. $cellaxiscount$ describes the number of subdivisions per axis. $c$ is the number of cells per node. $d_{max}$ is the maximum depth.

1   compute $i_{l_x}, \ldots, i_{u_y}$ using $D_x, D_y$ and $cellsize$ at $d_{max}$ identical to Algorithm 8.
2   $b \leftarrow \lceil log_2(cellaxiscount) \rceil$ { bits required to encode the cells per axis }
3   $bitmask \leftarrow 2^b - 1$
4   $H_r \leftarrow \emptyset$ {vector storing $h_{tree}$ values }
5   $h_l \leftarrow 0$
6   $h_r \leftarrow 0$
7   for $d = 0$ to $d_{max}$ do
8      $ti_{l_x} \leftarrow (i_{l_x} \gg (d_{max} - d))$ & $bitmask$
9      $ti_{l_y} \leftarrow (i_{l_y} \gg (d_{max} - d))$ & $bitmask$
10     $ti_{u_x} \leftarrow (i_{u_x} \gg (d_{max} - d))$ & $bitmask$
11     $ti_{u_y} \leftarrow (i_{u_y} \gg (d_{max} - d))$ & $bitmask$
12     $q_l \leftarrow$ bit interleave $ti_{l_x}$ and $ti_{l_y}$ for Z-order
13     $q_r \leftarrow$ bit interleave $ti_{u_x}$ and $ti_{u_y}$ for Z-order
14     $a_1 \leftarrow N_c(d_{max} - d)$ { see equation 4.1 }
15     $h_l \leftarrow h_l + a_1 \cdot q_l$
16     $h_r \leftarrow h_r + a_1 \cdot q_r$
17     $a_2 \leftarrow N_c(d_{max} - d - 1)$
18     $H_r \leftarrow H_r \cup \{h_r + a_2 \cdot c\}$
19   $H = \{(h_l, h_r)\} \cup \{(h, h) : h \in H_r - h_r\}$
20   foreach $\{h_{min}, h_{max}\} \in H$ do
21     if $h_{min}$ and $h_{max}$ are not within the range of $min(I_h), \ldots, max(I_h)$ then
22        continue
23     $n_{start} \leftarrow$ binary search of $h_{min}$ in $I_h$ for the first occurrence's position.
24     $n_{end} \leftarrow$ binary search of $h_{max}$ in $I_h$ for the last occurrence's position.
25     $IndexScan(l_x, v_x, \geq, n_{start}, n_{end}, r_{l_x})$
26     $IndexScan(l_y, v_y, \geq, n_{start}, n_{end}, r_{l_y})$
27     $IndexScan(l_{u_x}, v_{u_x}, \leq, n_{start}, n_{end}, r_{u_x})$
28     $IndexScan(l_{u_y}, v_{u_y}, \leq, n_{start}, n_{end}, r_{u_y})$
29     $r \leftarrow r_{l_x}$ & $r_{l_y}$ & $r_{u_x}$ & $r_{u_y}$
30   return $r$

FIG. 21

QUERYING SPATIAL DATA IN COLUMN STORES USING GRID-ORDER SCANS

TECHNICAL FIELD

The subject matter described herein relates to querying of spatial data using a grid-order scan technique.

BACKGROUND

The evaluation of spatial predicates, such as the determination of whether two or more spatial objects intersect, touch or are disjoint, can be a resource intensive task. Given are a large set of spatial objects embedded in a two or greater dimension space, an area can be defined (e.g., a rectangular area) in space and the system can be queried to determine which objects intersect or, alternatively, are fully within this area. Largely dependent on a number of potential intersecting/enveloped objects, such a determination can additionally slow down responsiveness of a query as many different operations need to be implemented (many of which ultimately end up not being necessary).

SUMMARY

A query of spatial data is received by a database comprising a columnar data store storing data in a column-oriented structure. Thereafter, a minimal bounding rectangle associated with the query is identified using a grid order scanning technique. The spatial data set corresponding to the received query is then mapped to physical storage in the database using the identified minimal bounding rectangle so that the spatial data set can be retrieved.

The grid order can be a bounded space divided into a homogenous uniform grid of cells having a fixed boundary. Alternatively, the grid order can be divided into rectangular cells. The cells of the grid can be indexed by a space-filling curve such as Hilbert space-filling curve.

A reference to each bounding rectangle can be stored redundantly for every cell it intersects. A reference to each bounding rectangle can be stored only for a cell at which a corner of the bounding rectangle is inside. A parameter can define a number of adjacent cells per dimension extending from the corner.

Bounding rectangles having a size above a certain level can be assigned an overflow cell. The size can be based on a number of adjacent cells per dimension that the bounding rectangle can intersect. The overflow cell can be checked for each query.

The current subject matter provides an index structure with column stores using bounding rectangle approximations of spatial data with the objective to increase performance of a certain set of spatial predicate queries. The index structure covers aspects of column-store lightweight compression techniques and enforces an order on the entries of index vectors by using either grid or tree space subdivision approaches, both respectively combined with the Hilbert and the Morton space filling curves.

To speed-up the filtering refine process as described above, all bounding rectangles can be stored with a specific ordering in memory (with respect to column stores). In terms of column stores, storing these minimum bounding rectangles can be achieved by storing a minimal and a maximal value per dimension, i.e., a lower-left and an upper-right corner point coordinates of the rectangle. The lower left and upper right corner point have an x-value and a y-value. To reduce the memory footprint, dictionary compression can be applied across all minimal bounding rectangles. This can be achieved in two ways.

Either there can be four dictionaries storing unique values, one for each coordinate-value (lower-left-x, lower-left-y, upper-right x, upper-right-y). Alternatively, only two dictionaries can be used, one for all x-values and one for all y-values with no restriction to which corner. Additionally, every minimum bounding rectangle has an integer ordering-value stored in a separate dictionary. This value is computed by either the grid- or tree-order.

The grid-order defines following three characteristics: (i) the bounded space can be divided into a homogeneous uniform grid of cells with a fixed boundary or alternatively into rectangular cells (that are not necessarily uniform); (ii) the cells of the grid can be indexed by a space-filling curve; and (iii) bounding rectangles that do not fit into a single cell have to be handled separately. Two specializations of the grid-order (FULL-storage and SINGLE-storage) can be utilized. The grid-order with FULL-storage approach can store the reference to the bounding rectangle redundantly for every cell it intersects. For the intersect- and inside-query, the rectangle of the query can be checked against the grid and all cells that it intersects are determined. The smallest and the largest cell-identifier are relevant; they correspond to the first and the last bounding rectangle that has to be tested. The grid-order technique can use a Hilbert space filling curve.

The dictionaries for the lower-left and upper-right values can be extracted and checked for intersection only for the relevant range in the index vectors of the bounding rectangles. After this region has been processed, the object candidates have been found and the more expensive testing can begin.

The grid-order with SINGLE-storage can only store the reference to the bounding for the cell, where the lower-left corner of the bounding rectangle is inside. Bounding rectangles have now to "fit" a cell if it is small enough. Bounding rectangles that are too "large" can be assigned an exclusive ordering value that is not available as grid-identifier (called overflow-cell). For this, a parameter can be introduced that defines the number of adjacent cells per dimension that a bounding rectangle can intersect so that the lower-left corner is considered. If this bounding rectangle intersects more adjacent cells in a dimension then the exclusive ordering-value is assigned.

For the intersect- and inside-query only slightly changes can be made. The query-rectangle can be extended in the lower and in the left direction by the amount of cells that is defined by the parameter above. This is to guarantee, that no bounding rectangles are missed as only the lower-left corner is considered.

The remaining scanning and testing are done as with the FULL-storage, except that two (likely distinct) ranges are scanned. This method benefits if the number of bounding rectangles in the overflow-cell is small. To keep this number small, statistics about the average edge length of the bounding rectangles can be computed during the insert of the data. The resolution of the grid can be set to be slightly larger than the average edge length per dimension. The parameter to determine the overflow-cell is now set to be "2".

The tree-order can be defined by such that space can be recursively subdivided into a grid. Every level can have a finer resolution; however, the global boundary remains the same. Overall, this arrangement looks like several overlapping grids with different resolutions. Bounding rectangles can be assigned to at most one single cell at a specific level (aka, a single node of the tree). The number of children per tree-Node can be variable, but restricted to the number of subdivisions per cell, e.g., four, eight, sixteen, etc. in 2D. The number of subdivisions per cell is the same for all cells. The tree is always has a fixed depth, and every possible cell can be assigned an enumerated number. The depth of the tree is related to the bits available for the enumerated number. The Z-order space filling curve enumeration can be applied for every grid level separately. In addition, child nodes can always have a smaller number than their parent (post-order enumeration).

For a query, similar to the grid-order, the query rectangle can be defined. The ordering-value of the lower-left and upper-right corners of the rectangle can be computed (i.e., a lookup in which cells they are contained). The range from the lower and upper ordering value contains most of the relevant bounding rectangles. Other than the grid-order some possible bounding rectangles are still missing. Such rectangles can be found in the parent nodes of the upper-right coordinate value. This arrangement overall results in multiple smaller ranges that have to be scanned.

Non-transitory computer program products (i.e., physically embodied computer program products) are also described that store instructions, which when executed one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The current subject matter provides many advantages. Implemented and evaluated inside a real-time computing environment such as the SAP HANA framework, the current subject matter demonstrates significant results in terms of compression techniques using dictionary encoding using real-world and synthetic data sets as well as a reasonable gain in query runtime performance for large enough data sets. Furthermore, the current subject matter is advantageous in that simple parameter estimation based on the bounding boxes' edge length shows no significant decrease in runtime. The current subject matter beneficial not only for 3D mesh data but also to other spatial types and spatial-temporal query patterns.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 7 is a diagram illustrating an algorithm for non-parallel scanning of an index vector for a given value identifier (ID);

FIG. 8 is a diagram illustrating an algorithm for performing a filter step of an equals-query for a given mesh and its bounding box;

FIG. 10 is a diagram illustrating an algorithm for performing a filter step of an intersects-query for a given mesh and its bounding box;

FIG. 11 is a diagram illustrating an algorithm for performing a filter step of the inside-query for a given mesh and its bounding box;

FIG. 13 is a diagram illustrating a sample set of the bounding boxes from FIG. 3 represented with a) a full-storage technique, b) a single-storage technique with k=2.

FIG. 16 is a diagram illustrating an algorithm for an insert process of a set of bounding boxes with a single-storage technique;

FIG. 17 is a diagram illustrating an algorithm for computing grid-order $h_{grid}$ using a single-storage technique;

FIG. 18 is a diagram illustrating an algorithm for performing a filter step of an intersects-query with a single-storage technique;

FIG. 19 is a diagram illustrating an algorithm for computing a tree-order $h_{tree}$;

FIG. 21 is a diagram illustrating an algorithm for performing a filter step of an intersects-query with tree-order $h_{tree}$;

DETAILED DESCRIPTION

The current techniques querying spatial data in column stores are generic and can be applied to any type of (dictionary encoded) column store infrastructure including, but not limited to the SAP HANA platform. Using the current subject matter, queries of spatial data can be seaminglessly integrated into a database front-end (e.g., the SAP HANA front-end, etc.) using standard language features for spatial data types and methods.

In column-stores, in main memory, vectors of values are continuous and are typically not viewed in a block-oriented fashion. Therefore, it is desirable to map spatial data specified in 2- or 3-dimensional space based on some total order that preserves spatial proximity of the objects when physically stored. Space-filling curves have such a property. The current subject uses space-filling curves for mapping spatial point objects to column stores adopts and for tailoring techniques for mapping n-dimensional values or neighbor-finding to the specifics of column stores.

Although the current mapping strategies can be seamlessly integrated into any column store system, below is some information about the SAP HANA infrastructure with respect to the overall architecture, update handling, dictionary coding principles, and memory scan optimizations.

Figure 1:
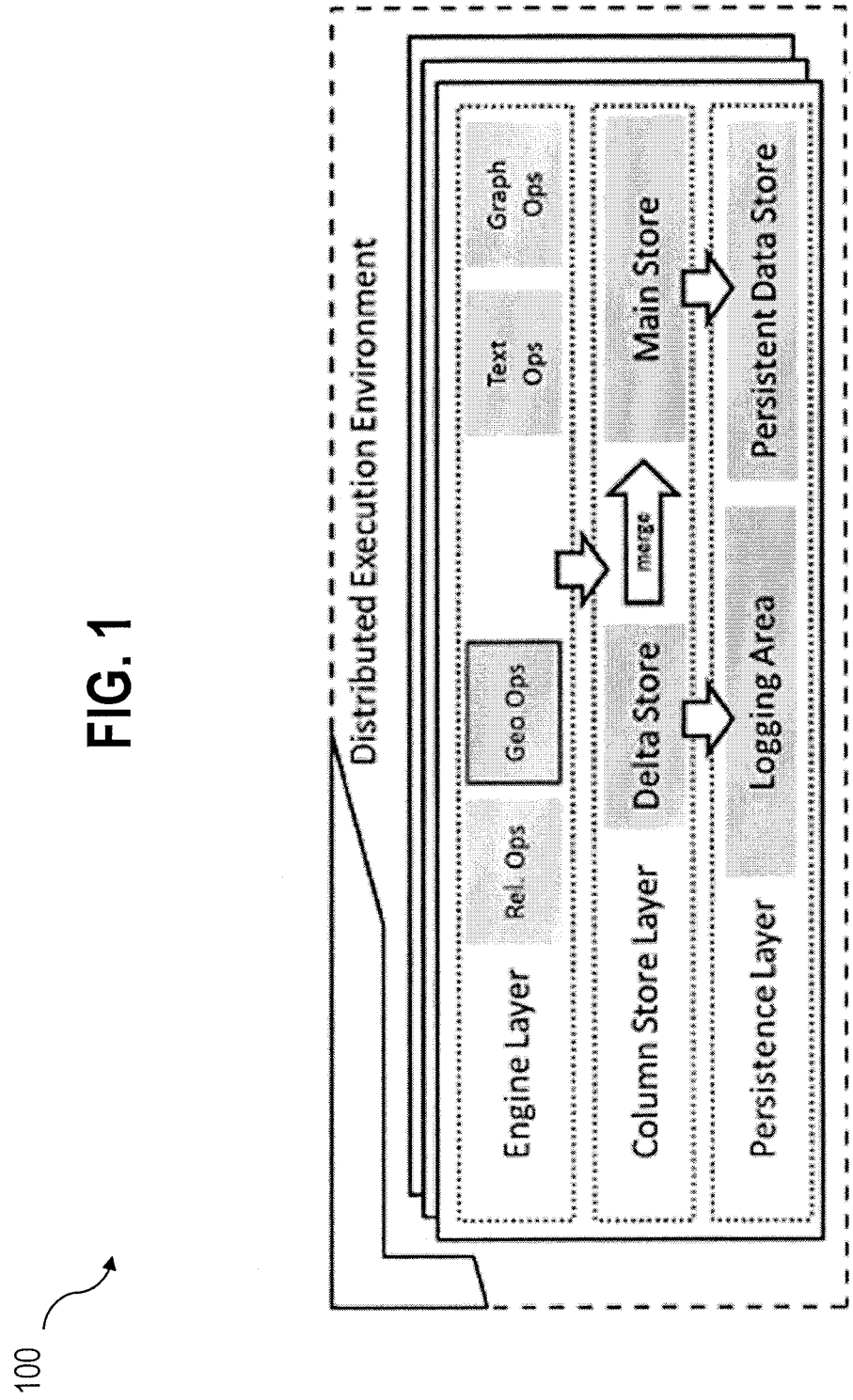
FIG. 1 is a diagram illustrating a database environment including a column store.

The SAP HANA database itself follows a strict layered architecture. Similar to classical systems, the SAP HANA database distinguishes between compile time and run time of a database request. Multiple components like transaction manger, authorization manager, meta data (replication) manager, session management are clustered around a distributed data flow execution environment. Within this environment, different sets of plan operators provide the abstraction from the column-oriented storage model to the corresponding data model. The engine currently supports a wide range of different set of operators ranging from relational operators (for the core SQL data model) to text or graph processing operators (for more elaborated and partially domain and SAP-specific data models). The general architectural design decouples the access primitives of the storage system from the different model-specific views on the data. The set of geo operators providing the functionality of geo-aware methods on top of geo-agnostic data structures complements this set of plan operators (as shown in diagram 100 of FIG. 1) and automatically takes advantage of all functional and non-functional characteristics of the column store layer, for example:

Transactional Behavior: The column store layer provides a transactionally consistent view to the engine layer following the MVCC principle. All operations of a query on top of this layer are transparently embedded into a sphere of control with access only to the correct underlying version of data.

Update Processing: Comparable to all column-store systems, the SAP HANA database also consists of a write-optimized delta store and a read-optimized main store. All data modifications are reflected within the delta store, e.g., inserts of new versions of existing entities are represented within the delta. Deletes are either directly reflected in the delta or signaled via an additional bit-vector for the main store. As the delta grows over time, a merge process eventually moves delta entries to the read-optimized main structure. For the scope of the paper, we want to emphasize that all modifications coming from the user or directly within the system are encapsulated within the column store layer and transparent for the engine layer.

Figure 2:
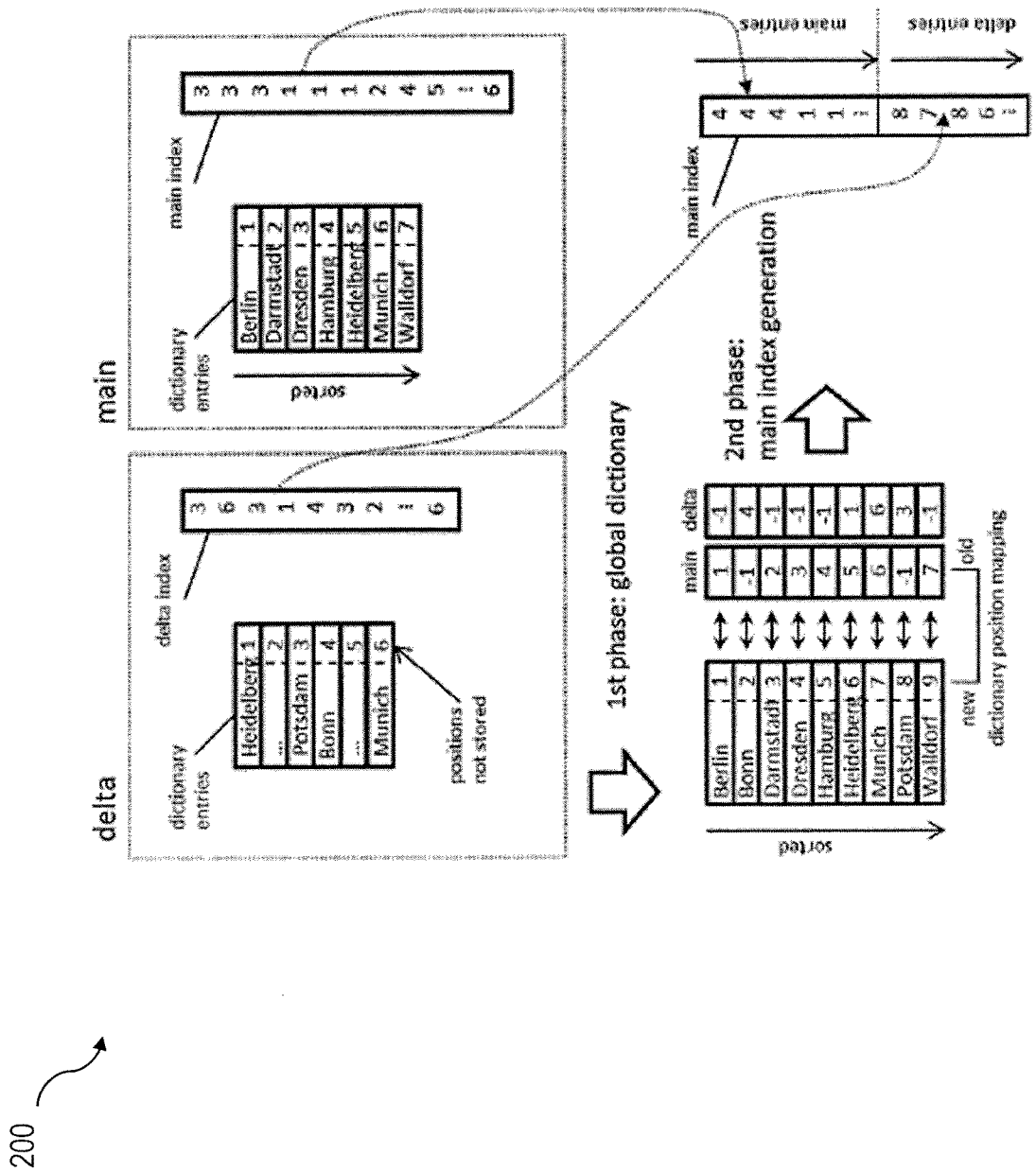
FIG. 2 is a diagram illustrating data dictionaries and a corresponding bit compressed vector.

Dictionary Encoding: The column store engine applies dictionary encoding to all columns, independent of their cardinality of number of distinct values. As shown in diagram 200 of FIG. 2, a column then results in two data structures: on the one hand the dictionary, mapping the user-values to Value IDs. On the other hand the bit compressed vector with Value IDs representing the columns of the original table. Due to frequent modifications and its temporary characteristics, the dictionary of the delta is unsorted. The dictionary of the read-optimized main, however, is sorted with respect to the user values. A merge then basically consists of two steps. In a first phase, a new dictionary is constructed, consolidating the entries of the main and delta dictionaries and generating new Value IDs. In a second step, the main bit compressed vectors are recreated by physically generating a new image of the bit compressed vector consisting of the old entries (ignoring deletes) and new entries of the delta. Obviously many highly optimized versions of the process exist to speed up the merge process for specific scenarios. Again, the layer above does not notice such internal and asynchronous reorganization steps. To summarize, the SAP HANA database design provides a basis for a seamless integration of data-model specific operators relying on core column store data structures. All updates, reorganizations, efficient scan implementations etc. are completely transparent for the engine layer and can be exploited via well-defined scan methods. This arrangement allows for easy adopting the techniques and transfer into other columnar systems.

Bounding Box Indexing using Column Stores. The current subject matter can utilize a spatial indexing approach that uses bounding boxes as approximation for spatial data (e.g., data representing geometric modeling, etc.).

The right choice of an index structure is mainly driven by the types of queries that should be performed. For illustration purposes, the following focuses on large sets of meshes and their spatial relationship. The evaluation of spatial predicates on a large set of meshes are additionally of interest, because spatial predicates are typically also used as join predicates of two tables storing mesh data.

Various spatial predicates can be evaluated including Equal, Inside and Intersects. The Intersects-predicate has a definition from set-theory that allows it to be a filter step of other spatial predicates. The Inside-predicate can demonstrate how the filter step of the intersection query can be adjusted to function as a filter step for other predicates. Finally, the Equals-predicate can allows an alternative implementation of a filter step. In fact, the operands for the Intersects and Inside predicates do not have to be exclusively both mesh data types. As the spatial indexing methods described herein can use bounding boxes, different spatial objects (e.g., line-strings, polygons or multi-points, etc.) can be approximated by bounding boxes and thus may be indexed. Hence, these spatial predicates, mentioned above, can allow queries such as (e.g., for Intersection) mesh intersects line-string, mesh intersects polygon, mesh intersects bounding box (also known as window query).

A simple bounding volume can be used to approximate meshes. This arrangement also allows for indexing and storing other spatial objects in addition to mesh data. There can be different types of bounding volumes; and the current subject matter can be adapted to such different types. For illustration purposes, reference is made to minimal axis-aligned bounding boxes (AABB) and short bounding boxes. This bounding volume allows quick rectangular window queries. The bounding box approximation for a mesh (or another spatial object that should be indexed) can be computed in advance. The computation can be done when the mesh data is loaded into memory of a column store. An important part is how to store the bounding boxes in column stores so that queries can be efficiently performed.

Figure 3:
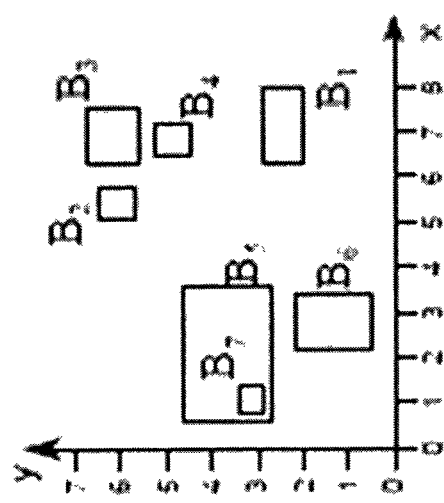
FIG. 3 is a diagram illustrating a sample set of bounding boxes in two dimensional Euclidean space.

The following is directed to three different approaches on how to store bounding boxes in column stores. For simplification, a two dimensional space is used and significant changes for three dimensional cases are noted. Diagram 300 of FIG. 3 shows a sample set of bounding boxes, which are used by the examples below. In particular, FIG. 3 is a sample set of bounding boxes in a two dimensional Euclidean space.

Two storage techniques for point data in column stores can be used, sometimes referred to as Point-Dictionary-Mapping (PDM) and Axis-Dictionary-Mapping (ADM). Both techniques make use of index vectors and dictionaries to represent points. The Point-Dictionary-Mapping has only a single dictionary D for numerical values, which is shared by the x- and y-coordinates of 2D points. For the x- and y-axes there are separate index vectors ($I_x$ and $I_y$), which refer to the correct numerical value in D. It has been shown that this approach has a smaller memory footprint than the ADM but also tends to not efficiently use caching.

Figure 4:
FIG. 4 is a diagram illustrating a) a tabular overview of an example pointset P, b) P represented with Point-Dictionary-Mapping, and c) P represented with Axis-Dictionary-Mapping.

Axis-Dictionary-Mapping uses for each axis a separate dictionary ($D_x$ and $D_y$) and index vectors ($I_x$ and $I_y$). It has a slightly larger memory footprint and can lead to duplicate values. Nevertheless, it has a better cache lookup and is easier to maintain in parallel, because each axis can be computed on its own. FIG. 4 is a diagram 400 that illustrates a conceptual example for both approaches. In particular, illustrated are a) a tabular overview of an example pointset P={$p_1$, . . . , $p_8$}; b) pointset P represented with Point-Dictionary-Mapping; and c) pointset P represented with Axis-Dictionary-Mapping.

Naive Representation of Bounding Boxes in Column Stores. The following describes how to store bounding boxes using column stores and how queries can be performed using the resulting data structure.

As a bounding box B can be represented by two extreme points, B.ll=($l_x$; $l_y$) and B.ur=($u_x$; $u_y$), a straightforward approach would be to use the Axis-Dictionary-Mapping for both points. This means that we have (in 2D) four dictionaries ($D_{lx}$; $D_{ly}$; $D_{ux}$; $D_{uy}$) and four index vectors ($I_{lx}$; $I_{ly}$; $I_{ux}$; $I_{uy}$). Alternatively one can reduce this (in 2D) to two dictionaries ($D_x$; $D_y$) and the same four index vectors.

Figure 5:
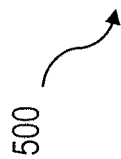
FIG. 5 is a diagram illustrating a sample set of bounding boxes represented with Non-Shared-Axis Dictionary-Mapping.
Figure 6:
FIG. 6 is a diagram illustrating a sample set of bounding boxes represented with Shared-Axis Dictionary-Mapping.

One can do this actually, since there are only two axes (x and y) and either the lower left as well as the upper right point share some subspace, i. e., the x or they subspace. According to the "axis-sharing" property we will introduce the terms Non-Shared-Axis-Dictionary-Mapping (Non-Shared-ADM) for the approach which uses as many dictionaries as index vectors, and the term Shared-Axis-Dictionary-Mapping (Shared-ADM) for the other one. FIG. 5 is a diagram 500 illustrating a sample set of bounding boxes represented with Non-Shared-ADM. FIG. 6 is a diagram 600 illustrating a sample set of bounding boxes represented with Shared-ADM.

The memory requirements depend on the number of bounding boxes that have to be stored. In both mappings all index vectors have the same number of entries.

However, they do not require the same amount of memory. We first want to take a look at the dictionaries. The Non-Shared-ADM has 4 dictionaries, and in this case all contain 7 entries. Each entry requires a single double value of 64 bits. The 7 entries can be indexed by [$\log_2 7$]=3 bit, thus each entry in the index vectors requires only 3 bits. Overall this results in 4·7·64 bit+4·7·3 bit=1876 bit.

The Shared-ADM has only 2 dictionaries, one with 14 and one with 12 entries. Both require 4 bit to encode. This makes a total memory requirement of (14+12)·64 bit+4·7·4 bit=1776 bit. In this example, this is a memory reduction of about 5%. In real case scenarios we expect the memory consumption to behave similarly.

Insert process. Inserting is a process of what is sometimes referred to as a delta-merge. For a set of new meshes (or other spatial objects) their bounding box has to be computed. The coordinates of the lower left and upper right points of all bounding boxes are used to create either the two dictionaries (Shared-ADM) or four dictionaries (Non-Shared-ADM). Afterward, the four index vectors are created using the dictionaries.

As both representations rely on a dictionary encoding of the index vectors, the dictionary encoding is one of the main points that have to be considered in case of a performance evaluation. As the dictionaries have to be sorted, to later allow binary search, the sorting process requires a linearithmic runtime in the number of dictionary entries. Each dictionary can be computed in parallel and the costs increase only dependent on the number of dictionaries. In case of mostly static or insert-only data, the insert costs can be amortized by an increased query performance.

Queries. For querying, an order on the entries of the index vectors is not enforced to allow fast sequential scans. As the bounding boxes approximate some spatial objects, queries can be separated in a filtering phase and a refinement phase. The filtering step of each query is described in further detail below. The refinement step can make use of specific and more expensive algorithms, which require the true geometric data that is represented by the bounding box.

In all cases, it can be assumed that a vector of meshes has already been inserted into the column store and approximated with bounding boxes using either Non-Shared-ADM or Shared-ADM. The term vector is used herein to denote that the order of the meshes in matters. The result of each filter step can be a temporary bit vector indicating with set bits that a mesh at a specific position in has to be refined. The bit vector can have the same length as the index vectors used to store the bounding boxes with Non-Shared-ADM or Shared-ADM.

Equals-Filter-Query. For a mesh M and a vector of meshes, and Equals query looks for all identical meshes M out of. Every mesh of that is possibly equal to M (due to the filter step) is marked within the bit vector.

First of all, the bounding box Q of M can be computed. Then, a lookup in the dictionaries (e. g., $D_x$; $D_y$ for the Shared-ADM) for the lower left Q.ll=($l_x$, $l_y$) and upper right Q.ur=($u_x$; $u_y$) coordinates can be performed. Explicitly, one has to check if $l_x$, $u_x \in D_x$ and $l_y$, $u_y \in D_y$. This can be done in O($\log_2 n$) time by binary search, where n is the number of dictionary entries. Each dictionary can be scanned in parallel and one can expect that on average it should take the same amount of processing time. If at least one entry is not found, the result set is empty and the query can terminate.

If in each dictionary a value ID ($v_{lx}$; $v_{ly}$; $v_{ux}$; $v_{uy}$) is found for the coordinates of the bounding box, the corresponding index vectors ($I_{lx}$; $I_{ly}$; $I_{ux}$; $I_{uy}$) can be scanned for matching entries. Algorithm 1 provided in diagram 700 of FIG. 7 illustrates the index scan conceptually without parallelism. In particular, diagram 700 illustrates pseudo code for the non-parallel scanning of an index vector for a given value ID. However, the index vector scan using SIMD operations can be used for some variations. Every scan hit can be marked in a temporary result bit vector of the same size as the index vectors FIG. 8 is a diagram 800 that illustrates pseudo code for performing the filter step of the equals-query for a given mesh and its bounding box (Algorithm 2). After scanning all index vectors, the bit vectors $r_{lx}$, . . . , $r_{uy}$ can be combined with a bitwise-and operator (&) to the resulting bit vector r. At this point, all possibly-equal meshes have been marked within the resulting bit vector r and the refinement step can be called.

At a refinement step, the mesh M itself as well as all possibly-equal meshes, due to the filter step from above, have to be accessed. Because each bit in r corresponds to a position in the vector of meshes, the mesh-equal operator can be called.

Intersects-Filter-Query. Given is a mesh M and the vector of meshes as before. The filter step can set a bit in the resulting bit vector r for every possible intersection of the meshes, i. e., for every true intersection of two bounding boxes. Hence, the first step can be to compute the bounding box Q for the mesh M. For the intersection of two bounding boxes, a definition such as the following can be used: Two bounding boxes A and B do intersect if and only if A.ur.x≥B.ll.x^A.ll.x≤B.ur.x^
A.ur.y≥B.ll.y^A.ll.y≤B.ur.y
where ^ denotes that logical AND-operator.

Figure 9:
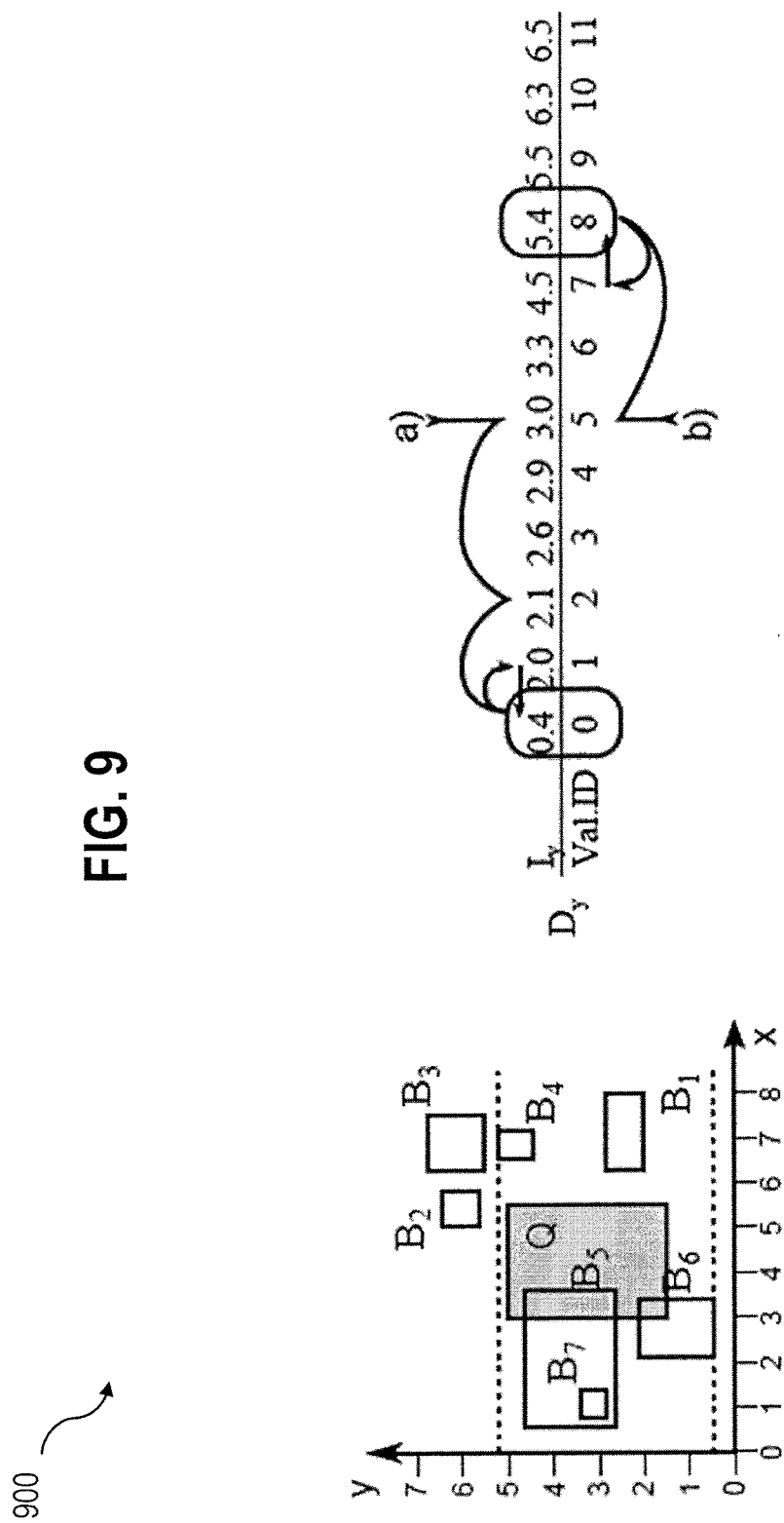
FIG. 9 is a diagram illustrating lookup of y-values coordinates of a given bounding box.

Similar to the equals-filter step, a lookup of the coordinate values ($l_x$; $l_y$; $u_x$; $u_y$) of the bounding box can be done in the dictionaries. In this case, one does not have to look exclusively for equality of Q's lower and upper coordinates. Instead the algorithm can first check if the exact value can be found in the dictionary. If not, either the next smaller or larger value ID is picked, depending on either the lower or upper coordinate. If no next smaller or larger value exits in the dictionary, the minimum or maximum value ID of the dictionary is picked. This lookup can be achieved in logarithmic time by using binary search. FIG. 9 is a diagram 900 that illustrates this for one axis. In the example, the search for $l_x$=1.7 and $u_x$=5.0 in the dictionary $D_y$ yields $v_{ly}$=0 for the lower value ID and $v_{uy}$=8 for the upper value ID. In particular, FIG. 9 illustrates the lookup of the y-values coordinates of a given bounding box Q with $l_y$=1.7 and $u_y$=5.0 in the dictionary $D_y$. At reference a), according to binary search, the lookup of $l_y$ accesses 3.0; 2.1; 0.4 and 2.0, because no exact math is found, the next smaller value 0.4 is picked with the value ID $v_{ly}$=0. At reference b), the lookup for $u_y$ with 3.0; 5.4 and 4.5, again no exact fit is found and the next higher value ID $v_{uy}$=8 is picked.

The next steps of the intersection-filter step are similar to the equals-filter step. One has to scan the index vectors for the less than or equal or greater than or equal predicates with the value IDs $v_{lx}$; . . . ; $v_{uy}$ ascertained from the dictionary lookup.

FIG. 10 is a diagram 1000 that illustrates pseudocode for an Algorithm 3 that, in turn, illustrates the intersection-filter step for the intersection query. The result of the filter step, i.e., all intersections of bounding boxes, respectively all candidates for an intersection with mesh M, can be stored in the resulting bit vector r by and logical and-operator of all index vector scan results. As each set bit in the bit vector r corresponds to a mesh in, the true intersection with M can be tested. The refinement step for the intersection of two meshes can be called.

Inside-Filter-Query. In case of the inside filtering step, the algorithmic procedure looks similar to the intersection query. Hence, only the differences are addressed herein. One mesh can only be inside another mesh, if its minimal bounding box is also inside the others minimal bounding box. Similar to the intersection query, the lookup of the coordinate values of the bounding box within the dictionaries can be the same. Differently, the ascertained value IDs $v_{lx}$; . . . ; $v_{uy}$ are scanned (Algorithm 4 of FIG. 11). Literally, the algorithm for the inside filter step looks identical to Algorithm 3 except that lines 10 to 13 are changed to fit the following definition of the inside property of two bounding boxes.

Given two bounding boxes A and B. A is inside B if and only if

A.ur.x≥B.ll.x^A.ur.x≤B.ur.x^
A.ur.y≥B.ll.y^A.ur.y≤B.ur.y
Where ^ denotes that logical AND-operator.

Diagram 1100 of FIG. 11 illustrates Algorithm 4 and corresponding pseudo code for performing the filter step of the inside-query for a given mesh and its bounding box.

Index Vector Reordering. Described above is the naive representation of meshes' bounding boxes and how a set of spatial predicate queries are performed. Here, an order can be applied on the entries of the index vectors to increase query performance. The goal is to reorder bounding boxes with a space-filling curve to map them linearly in memory, i. e., to be more specific, to reorder the entries in the index vectors.

For a bounding box B, a mapping function h(B) can be used that computes an integer value similar to the distance along a space-filling curve. Two different orders can be used on the index vectors, where one uses a grid-like spatial partitioning and the other uses a tree-like spatial partitioning. grid-order $h_{grid}$(B) can subdivide the space uniformly into regions called cells. Cells can then be enumerated by a space-filling curve, respectively applying an order to bounding boxes and the objects within the cells. This arrangement allows for shrinking of the scan range on the index vectors, where candidates for the filter step of a query are possibly to be found. The second one, tree-order $h_{tree}$(B) can adapt the grid from before to density fluctuations across space by subdividing the space recursively (into finer cells) in a tree-like manner. With the tree-order, nodes in the tree can be enumerated by some combination of space-filling curve and hierarchy preserving order.

Figure 12:
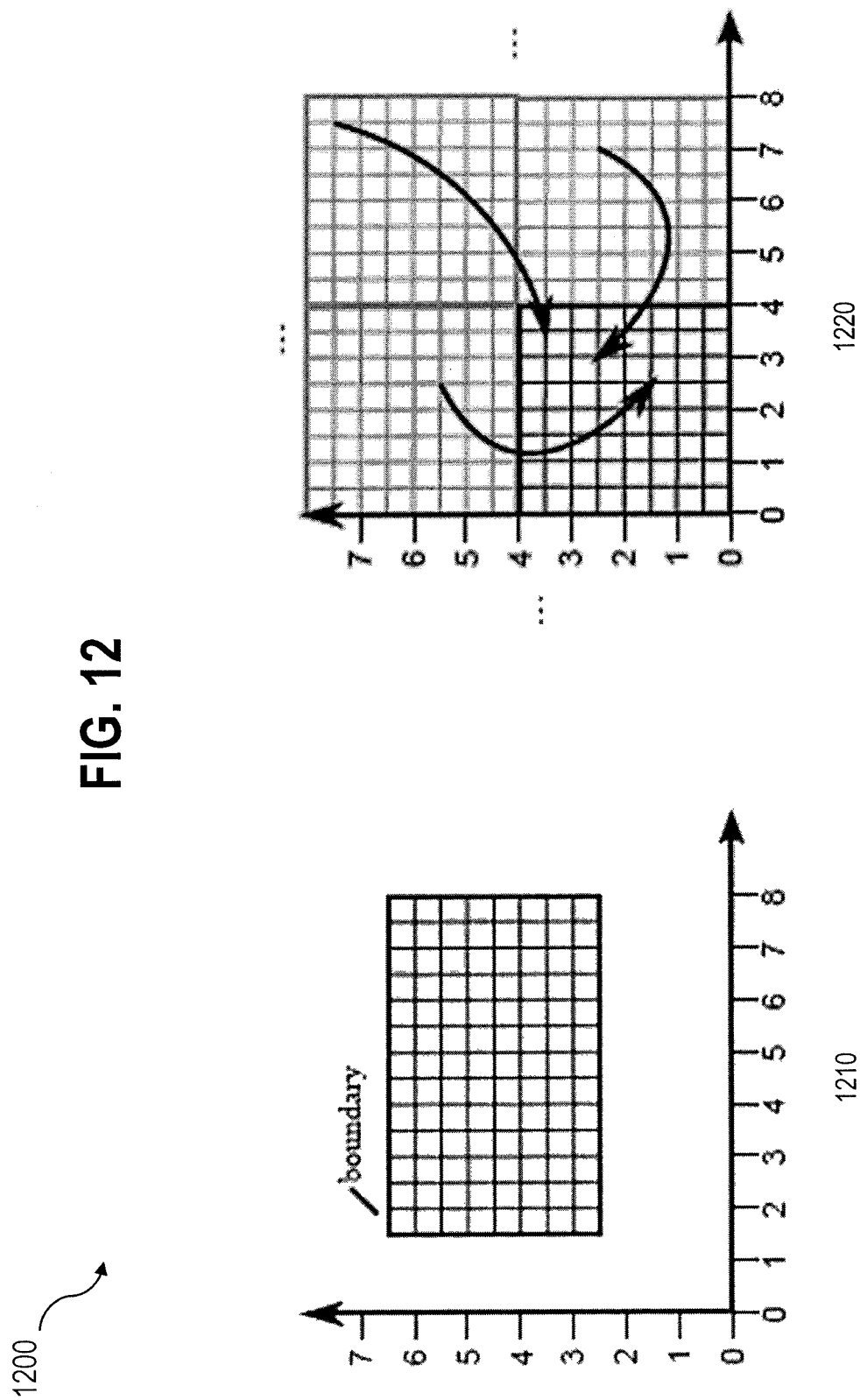
FIG. 12 is a diagram illustrating a grid with a fixed boundary and a grid with folded (hashed) space.

Grid-ordering. Subdividing the space into a uniform grid is an easy and fast way to provide a spatial index structure. It is possible to have either a grid with a fixed boundary or a grid with no boundary that repetitively maps the space onto the same cells (hashing). FIG. 12 is a diagram 1200 that illustrates a comparison of bounded 1210 and hashed space 1220. The grid with a boundary 1210 is simple and fast to compute, but requires a priori knowledge about the spatial extent. The grid with hashed space 1220 is good if no knowledge about the distribution of the objects in space is given. The computational costs of both techniques are almost identical, but when queries are performed, one has to keep in mind that the space is folded for the technique that uses hashing. Therefore, querying is slightly more time consuming.

Fortunately, there is already knowledge about the distribution of the objects in space. This information is easily accessible via the dictionaries. For instance, the boundary of the space is known as it is represented by the minimum and maximum values contained within the dictionaries, thus the non-hashed approach and omit handling special cases considering space folding can be used.

This grid-like order can be defined by three characteristics:

1. The bounded space is divided into a homogeneous uniform grid with fixed boundary.
2. The cells of the grid are indexed by a space-filling curve.
3. Bounding boxes that do not fit into a single cell have to be handled separately.

The uniform grid has two parameters that can be tuned. One is the number of subdivisions (per axis), called cellaxiscount the other is the length of a side of a cell, called cellsize. Having a fixed boundary helps to reduce this to a single parameter, the cellaxiscount. A higher cellaxiscount results in a smaller cellsize and vice versa. Having small cellsize intuitively provides a better separation of objects that are apart. The cells can be enumerated by using a Hilbert space-filling curve due to its good characteristics in comparison to other curves. In fact, a three-dimensional counterpart can be used.

Next, we show two realizations for the grid ordering, the full-storage and the single-storage. They cover in particular how bounding boxes are handled that do not fit into a single cell. A comparative illustration of both is given in diagram 1300 of FIG. 13. However, we will later refer to this figure in more detail. In particular, FIG. 13 illustrates a sample set of bounding boxes from FIG. 3 represented with a) the full-storage technique, b) the single-storage technique with k=2. In both cases $I_h$ denotes the value of $h_{grid}$. The index vectors are not shown, instead the corresponding objects are given. The cells are indexed via $i_x$; $i_y$ with a cellaxiscount=8 and cellsize=0.9375 and enumerated via the Hilbert-curve of order 2.

Full-Storage. If points have to be assigned to cells of a grid, they are always assigned to only one cell. If bounding boxes should be assigned to cells, it is possible that they are intersecting with many cells. There are a few solutions for this problem. For instance, it is possible to keep record of a bounding box in all cells that it intersects with, resulting in a higher memory consumption and redundancy. This can be implemented by adding replicated entries within the index vectors; this approach is referred to herein as full-storage.

Additionally, a separate vector can be required to do a mapping from some replica's ID to some object's identifier. For simplicity, it can be assumed that all bounding boxes have a sequentially increasing integer object identifier. The additional index vector can store for each replica, its object ID. After a query has been performed, this mapping can be applied to identify objects, not replicas. It is likely that, during the refinement step, the same object is tested multiple times, thus, handling which object has already been refined has to be done depending on the costs of the refinement step.

FIG. 13 a) illustrates the representation of full-storage for the example set of bounding boxes introduced in FIG. 3. In this example, $I_h$ has 34 entries for only 7 objects. The cellsize is set to 0.93 for illustration purpose, even if the average edge length of the bounding boxes is about 1.2, i.e., slightly larger.

Replicating data is a serious issue in terms of database storage. Due to a normalization process, data is meant to be free of redundancy. Thus, keeping record of replica is a counter intuitive approach. Described in further detail below, one can see that the cellsize is sensitive parameter and can lead to high amounts of replication. This means, if the resolution of the grid is too fine, large numbers of replication is present.

Figure 14:
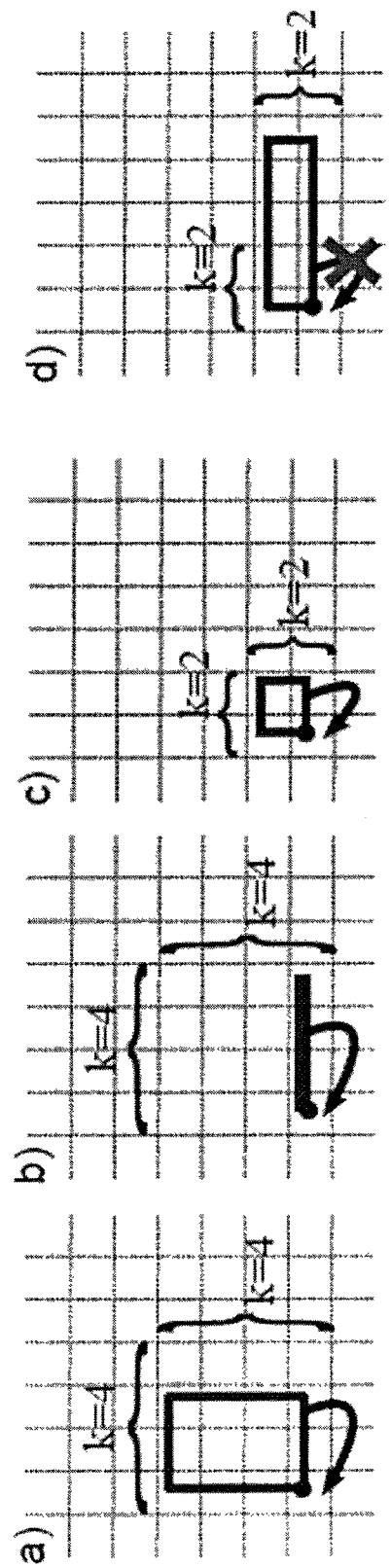
FIG. 14 is a diagram illustrating a single-storage technique with boxes having different parameters for k.

Single-Storage. As an alternative to the full-storage, where the whole bounding box is considered, one can focus on a single characteristic point of the bounding box, e. g., the lower left corner. One can then find the cell where this single point is contained. The bounding box can be assigned to this cell if it only intersects the next k upper right adjacent cells (i. e., in case of the cell of the lower left point). Diagram 1400 of FIG. 14 illustrates this approach with an example bounding box. For the introduction of this concept, the example will use only the direct upper right adjacent cells (k=2) and refer to adjacent cells in respect to the value of k. In particular, FIG. 14 illustrates single-storage technique with different parameters for k Example boxes a) to c) are stored at the lowest left cell of the box due to the chosen k value. Example d) is not allowed to be stored to its lowest left cell, because it spans more than two cells.

If a bounding box does not fit, i.e., an edge length of the bounding box is greater than the cellsize, it should be assigned to an exclusive overflow cell. A better realization of this is, to compute the cell for the upper right corner as well, and check if both cells are adjacent. This alternative realization can allow storing objects with up to a multiple of the cellsize into a single cell, depending on the parameter k.

Figure 15:
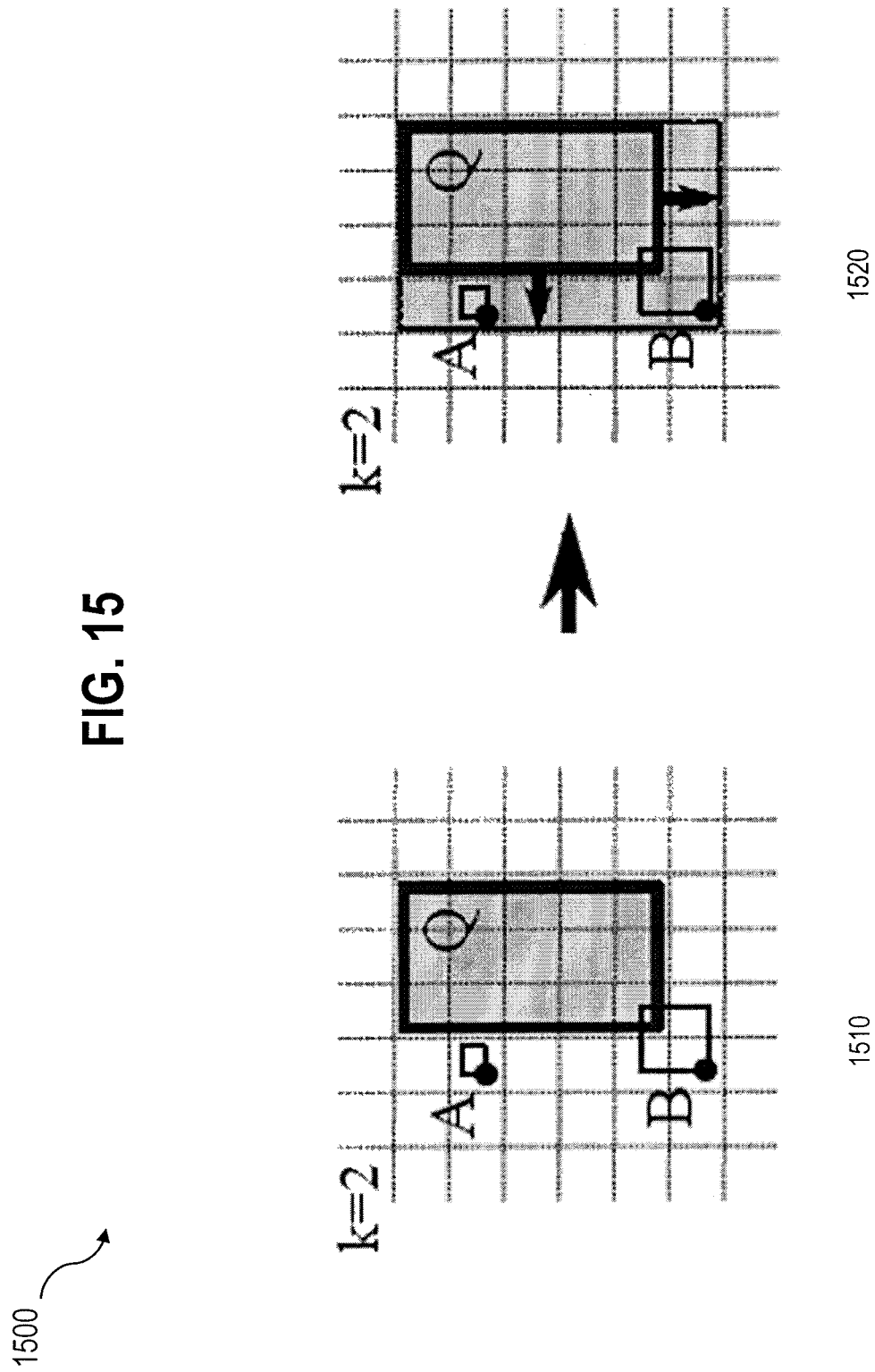
FIG. 15 is a diagram illustrating a window-intersection query using single-storage and k=2.

This method does not replicate data and, therefore, can be adapted to column stores. When queries have to be performed, the overflow cell has to be considered every time and one wants to keep the number of objects stored in the overflow cell to a minimum. Additionally, when a set of cells have to be investigated, e. g., for the window-intersection query, the window covers a set of cells. Due to the assignment policy of k adjacent cells from above, the lower left adjacent cells of the window have to be included as well. This is required as there might be bounding boxes stored, which span up to their k upper right adjacent cells and are covered by the window. This scan-behavior is illustrated in diagram 1500 of FIG. 15. In particular, FIG. 15 illustrates, at 1510, example window-intersection query using single-storage and k=2. The object B is missed, at 1520, because it reference point is not inside the window cells. The window is extended by (k−1) adjacent cells in the left and bottom direction to find all solutions. Here, object A is added, even it is not inside the window and has later to be filtered out. This approach can be referred due to its non-replication behavior as single-storage. FIG. 13 b) illustrates the single-storage representation of the sample set of bounding boxes. The same values for the cellsize are picked as with the full-storage technique.

Insert Process for Single-Storage. Diagram 1600 of FIG. 16 shows pseudo code for the insert process of a set of bounding boxes with the single-storage technique (Algorithm 5). At first, the lower left and upper right coordinates of a bounding box B is accessed and stored in temporary structure Temp. Then the dictionaries are computed from the x- and y-values. After that, the four index vectors can be created. At this moment, no order is enforced. To apply the single-storage grid-order, for each bounding box B the order $h_{grid}(B)$ is computed and stored in a vector $I_h$. After this is finished, the entries of the index vectors are sorted based on the values of $I_h$.

FIG. 17 is a diagram 1700 illustrating pseudocode for Algorithm 6 which, in turn, shows the computation of the grid-order $h_{grid}$ using single-storage. The basic principle is to extract the space boundary by accessing the first and last entry in the sorted dictionary for each axis. The cellsize is picked by the larger value of spanned space divided by the cellaxiscount along both axes. After that, for a given bounding box B the integer indices $i_{lx}$; . . . ; $i_{uy}$ are computed for B's lower and upper coordinates. If the indices differ one of the axes by more than (k−1), B is assigned the exclusive overflow cell value "−1". In all other cases, the Hilbert distance h is computed for the integer point using ($i_{lx}$, $i_{ly}$) the cellaxiscount for the order of the curve.

Intersects-Filter-Query for Single-Storage. FIG. 18 is a diagram 1800 that provides pseudocode for Algorithm 7 which, in turn, shows the filter step for the Intersects query for the single-storage approach. This Algorithm 7 omits the Inside and Equals query, as they can easily be adapted by changing the IndexScan operator to fit the inside property or equals property of bounding boxes from Algorithm 4 and Algorithm 2. FIG. 17 is a diagram 1700 for Algorithm 6 that provides pseudo code for computing the grid-order $h_{grid}$ using single-storage.

First, the indices $i_{lx}$; . . . ; $i_{uy}$ can be computed for the given bounding box coordinates similar to the insert process of a bounding box. The cellsize has to be identical to the insert process, therefore, it can be stored globally for this column during the insert process.

Now the lower and upper bound $h_{min}$, $h_{max}$ of the Hilbert distance can be computed. For the sake of simplicity, this can be achieved by scanning all cells intersecting with the bounding box area. However, this can be achieved far more efficient by iterating along the boundary of the bounding box, i.e., the four edges of the bounding box in the two-dimensional case. In the three-dimensional case, the six surfaces have to be scanned for the lower and the upper bound.

After that, the vector $I_h$ is scanned three times, to find the very first entry of $h_{min}$ and the last position of $h_{max}$, as well as the last position of where overflow entries ($h_{overflow}$) are stored. These positions (indices) are named $n_{start}$; $n_{end}$ and $n_{overflow}$. Differently from Algorithm 4, the IndexScan operation can be optimized so that only a smaller range has to be scanned. The cells which intersect with the bounding box are within the $n_{start}$ to $r_{end}$ range. The overflow cells range is from 0 to $n_{overflow}$, since it was assumed that every bounding box with overflow is assigned the "−1" value and therefore is sorted at the very beginning of the index vector. The bit vectors can be reused for the overflow scan range as they do not affect the same intervals.

Again the bit vectors are combined with a bitwise-and operator. Because the lower and upper bound of possible set bits are already known, only a part of the bit vector is going to contain set bits. The refinement step can definitively make use of these ranges in order to not iterate over a possible large set of unset bits.

Choosing the Cellsize Parameter. It has been shown that adjusting the cell size of the grid according to the diameter of the objects is a good estimation of the cellsize parameter. Values appear to be good for query performance if the ratio of cellsize and average object diameter is about 1.0 to 2.0. Taking this into account, computing some statistics about the edge length of the bounding boxes seem to be appropriate.

For instance, it is possible to compute the average edge length as well as the standard deviation of the edge length of each bounding box. After that, the cellsize parameter can be adjusted to be larger than the average. Due to the limitation of the space-filling curve, the number of subdivisions per axis must remain a power of two. This has to be considered for the correct choice of the grid resolution. Described below is how the average edge length affects the size of the overflow cell as well as the number of objects per cell.

Furthermore, one can consider using different a separate cellsize parameters for each axis. This would allow a better adjustment of the grid to the given space extent. The restrictions on the subdivision per axis would remain the same.

Alternative Implementation using Dictionary Compression. During the insert process, the cellsize parameter can be used to subdivide the space into a grid. Using the single-storage technique, the queries rely on the fact that only the lower left adjacent cells are included during a scan for all objects that are not in the overflow bucket. If compactification is applied, then the value IDs of the dictionaries are used to identify the indices of the cells for a bounding box. The resulting grid would be irregular in respect to the space. Directly applying the single-storage and the insert property of k adjacent cells would increase the usage of the overflow cells, depending on the number of intersections of the bounding boxes. In case of many intersections, the overflow bucket would be large which is suboptimal.

Tree-ordering. In real case scenarios it might not be likely that the data is uniformly spread across space. Thus, one major downside of the grid-ordering is that it only reaches its full potential if the data is uniformly distributed. To compensate this, some simple adaptiveness should be applied. To address this, the space can be subdivided recursively if a locally finer spatial resolution is needed. This leads to a tree-like structure, where bounding boxes are either stored in leaves or inner nodes of the tree. The basic idea of this approach is that one does not want to store a tree explicitly. Instead, the inner nodes and leaf nodes of the tree can be enumerated. This applies the same enumeration order to the bounding boxes, i.e., to the entries in the index vectors.

The enumeration can later allow long scan intervals with respect in preserving the tree structure, i. e., child nodes should be automatically included if a parent node has to be searched. Additionally, child nodes should be able to identify their parent node solely based by their own enumerated index. This also means that creating a tree as a temporary structure, then traversing it to enumerate the nodes and finally deleting the tree is not a solution. The approach using a temporary tree structure would later, during scan operations, require knowledge about the tree, which is not wanted to be persistent. Thus, all object-driven partitioning tree-like structures like R-tree variants are of no interest for our purposes.

The tree structure that we want to use is based on a MX-CIF structure, a space driven subdivision similar to a quadtree. Objects that should be stored in this tree can be assigned to their minimum enclosing cell. This means that an object is always assigned to exactly one cell, thus no replica are created. This is achieved by storing the object at a higher level in the tree, if the objects intersect a cell boundary. If necessary, objects are also stored in the root node. The MX-CIF tree can have one particular downside, because all objects that are stored at higher levels in the tree are likely considered as candidates by filter step of a query, even if they are not spatially relevant for the query.

Key goals for the tree-ordering can include:
1. The tree-ordering should always have a fixed depth, because we do not want to materialize it, thus every possible node has to be assigned a number.
2. The MX-CIF structure allows storage of objects at inner nodes, thus even if our query window of interest covers a small subspace (cells), all parent nodes have to be visited up to the root. This implies that the tree is kept as shallow as possible.
3. A shallow tree can be achieved by experimenting with storing a full grid per node, and not only four or eight subdivisions, like in a quadtree or octree.
4. A space-filling curve can be applied on the grid cells across all levels.

One major issue is the right choice of the space-filling curve. It should not only support good spatial coherence characteristics but also allow a quick calculation of distances along the curve. Furthermore it should allow for a quick determination of the distance along the space-filling curve of the parent cell, given a child cell and the child cell's distance along the space-filling. This can be simplified if a post-ordering enumeration is used, because then, parent nodes are likely to be already included within the scan range.

With grid-ordering, the Hilbert space-filling curve can be used. For the tree-order the Hilbert space-filing curve is less suited. This means, the recursive definition contains rotation and reflection making the parent computation of a node complex. So, alternatives have to be found. The Morton order (Z-order or N-order) are both easy to compute alternatives, which support a fast computation of the parent node property.

Insert process. The insert algorithm for the tree-order is identical to the single-storage grid-order (Algorithm 6), except that instead of $h_{grid}$ $h_{tree}$ is computed. In Algorithm 8 (see diagram 1800 of FIG. 18 which shows pseudo code for computing the tree-order $h_{tree}$) the computation of $h_{tree}$ is shown. Given are the minimum and maximum space spanning points, which are extracted by the smallest and largest entries within the dictionaries $D_x$, $D_y$. Given are also the bounding box B and the cellaxiscount. It requires, additionally, the maximum depth $d_{max}$ of the tree. Using the Z-order and its inexpensive bit-interleaving computation, maximum depth is related to the length of the bits used to store the largest cell index and c.

In a dim-dimensional space, the number of bits required to apply a grid with cellaxiscount subdivisions per axis and c:=cellaxiscount$^{dim}$ cells is bits(c):=[log$_2$(c)e=]. If we assume an integer representation of 63 bits (omitting the most significant bit), the maximum depth is $d_{max}$:=[63/bits (c)]. For a pure quadtree with c=4, the maximum level is 31, for an octree it is 21.

The computation of $h_{tree}$ for B can start from the lowest level $d_{max}$ and check if B fits in one cell for this level. If not, the next higher level can be inspected until the root level where only single cell is reached. In fact, one can estimate the first level that has to be inspected by the logarithm of the spanned space and on the longest edge length of B. This is not necessary assuming a shallow tree. For the lower left and upper right coordinate values $l_x$, . . . , $u_y$ of B, the cell indices can be computed per axis $i_{lx}$, . . . , $i_{uy}$ for level $d_{max}$. If they describe only one cell, the right tree level is found. If not, $i_{lx}$, . . . , $i_{uy}$ are shifted bitwise right (and thus a tree level up) according to the bits bits(c) required to encode c. This is repeated until only one cell is required. This level can be denoted as $d_{fit}$.

Using $d_{fit}$ and $i_{lx}$, $i_{ly}$, the distance along the space-filling curve is computed now. For this, one needs the total number of nodes in a full tree $N_c(d)$ of level d with c childs per node is:4

$$N_c(d) = \sum_{l=0}^{d} c^l = \frac{c^{d+1}}{c-1} - \frac{1}{c-1}.$$

Starting from the root level (described by d=0), the tree can be descended until $d_{fit}$ is reached. At $d_{fit}$ it is guaranteed that the bounding box fits in exactly one cell, so only one corner of the bounding box has to be considered further on. At each step, the bits describing the cells at level d can be extracted by bit-shifting and bit-masking. The bits $t_{ilx}$, $t_{iux}$ can then be interleaved in order to apply the distance q along the Z-order space-filling curve. Every step along the curve describes a whole sub-tree with $N_c(d_{max}-d)$ nodes, thus, this number of nodes is added to $h_{tree}$ multiplied by q. If $d_{fit}$ is not equal to $d_{max}$, an additional full sub-tree can be added, which cannot be included during the previous loop. This is based on the fact that the bounding box is stored at an inner node of the tree and not at a leaf node.

Figure 20:
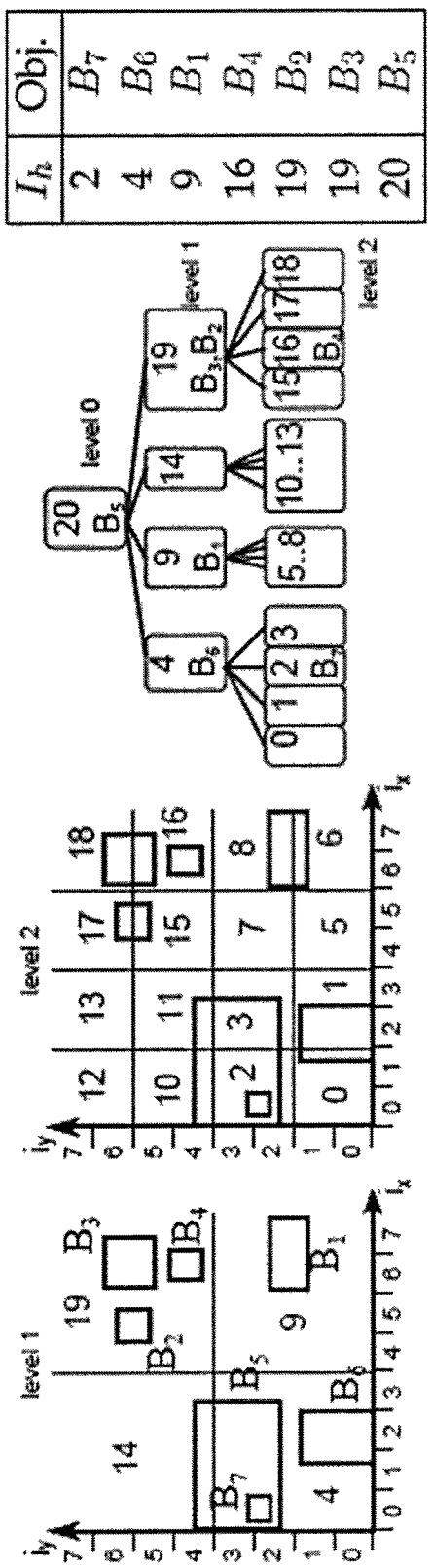
FIG. 20 is a diagram illustrating a sample set of bounding boxes from FIG. 3 using tree-order.

FIG. 20 is a diagram 2000 illustrating a sample set of bounding boxes using the tree-order. The maximum depth dmax is set to 2, the cellaxiscount is 2 (quadtree). Level 0 (the root node) represents the whole space. Not every cell has an object assigned, only one cell has two objects assigned and even the root node at level 0 has one object assigned.

Queries. In terms of querying, the allowance of storing bounding boxes at inner nodes has to be taken into account. Algorithm 9 (see diagram 2100 of FIG. 21) shows pseudo-code for the filter step for the intersection query using tree-order. The bounding box that is checked for intersection is denoted by its lower left and upper right coordinates $l_x$, $l_y$; $u_x$, $u_y$, the sorted index vectors by $I_{lx}$, . . . , $I_{uy}$ and the dictionaries by $D_x$; $D_y$. The sorted vector $I_h$ stores the $h_{tree}$ values during the import process. The cellsize c, the number c of cells per node as well as the maximum depth $d_{max}$ are the same as during the import process.

The intersection filter first computes $h_{tree}$ for the lower left and upper right coordinates together. For the lower left coordinate, only the node order ($h_l$) based on $d_{max}$ is required. For the upper right coordinate a set $H_r$ of nodes orders ($h_r$) are computed. The question is why this is sufficient.

Based on the post-order enumeration of the nodes, all parent nodes (and great parent nodes, etc.) of the lower left coordinate except the ones that are shared with the upper right coordinate's parents are already within the range $h_l$, . . . , $h_r$. Since all parents up to the root level are potential candidates, only the parent nodes of the upper right have to be stored in $H_r$.

Figure 22:
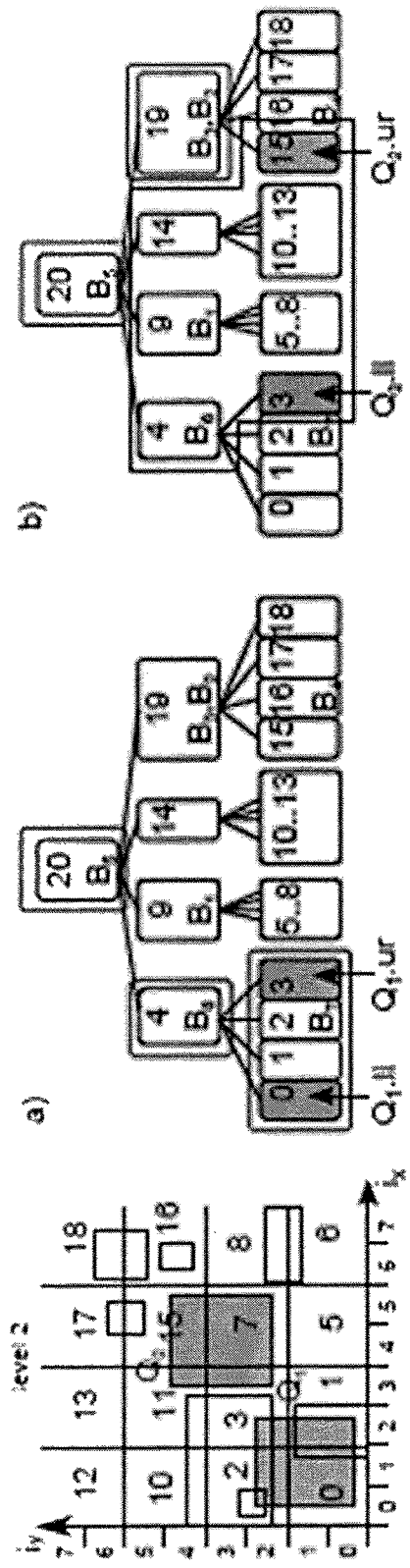
FIG. 22 is a diagram illustrating a set of bounding boxes with tree-order queried with two bounding boxes $Q1$ and $Q_2$ for intersection.

FIG. 22 is a diagram 2200 that illustrates an example set of bounding boxes with tree-order queried with two bounding boxes $Q_1$ and $Q_2$ for intersection. a) Shows the nodes that are affected by $Q_1$. The $h_{tree}$ range 0 to 3 is scanned linearly, as well as 4 and 20. b) Shows the nodes affected by $Q_2$ with the range 3 to 15, 19 and 20. The scan range is illustrated by blue boundaries around the tree. The cells where the bounding boxes' lower left and upper right points are contained are highlighted.

Now, the set H of scan intervals is generated. It contains at first the scan range from $h_l$ to $h_r$. Additionally it contains the order of the parent nodes of the right coordinate, except $h_r$ itself. For each scan range ($h_{min}$; $h_{max}$) E H the first and last occurrence is binary searched in $I_h$. Finally, the index vectors $I_{lx}$, . . . , $I_{uy}$ are searched partially and the resulting bit vector r is returned.

Update and Delete Statements. All the above listed structures (naive bounding box representation and both index vector optimizations) support updates and deletes. In our case we focused on almost static data, or insert only data. Thus, one can expect that the number of updates or deletes is small. Nevertheless, directly updating the index vectors in case of an update or delete operation is definitively not advised and hard to achieve since both the dictionaries and index vectors have to be manipulated. This can be achieved alternatively by keeping track of valid entries within the structure, e. g., by using a bit vector indicating "invalid" entries.

If a record has to be deleted, the specific position of the bit vector representative for "invalid" entries is set. After a query has been performed, this bit vector is used to remove all invalid entries from the result. For updating, the old record is set as invalid and the new one is inserted with a new identifier. After a scan has been performed for a query, the result set has to be checked against the invalid bit vector.

After a specific number of records have been updated or deleted, or after a specific time has passed, a cleanup-step should be applied to rebuild the structure and remove invalid entries (e. g., bounding boxes, meshes, etc.) from the index vectors.

As the dictionaries are likely to be changed during an update or delete statement, the index vectors would be changed as well and a recomputation cannot be avoided. If the boundary of the space is not changed, e. g., the smallest and the largest numbers within the Dictionaries are the same, all space-filling curve distances remain the same. Only the distances for the new ones have to be computed. After this is done, they have to be inserted properly, i. e., at the correct position, within the already ordered index vectors.

Figure 23:
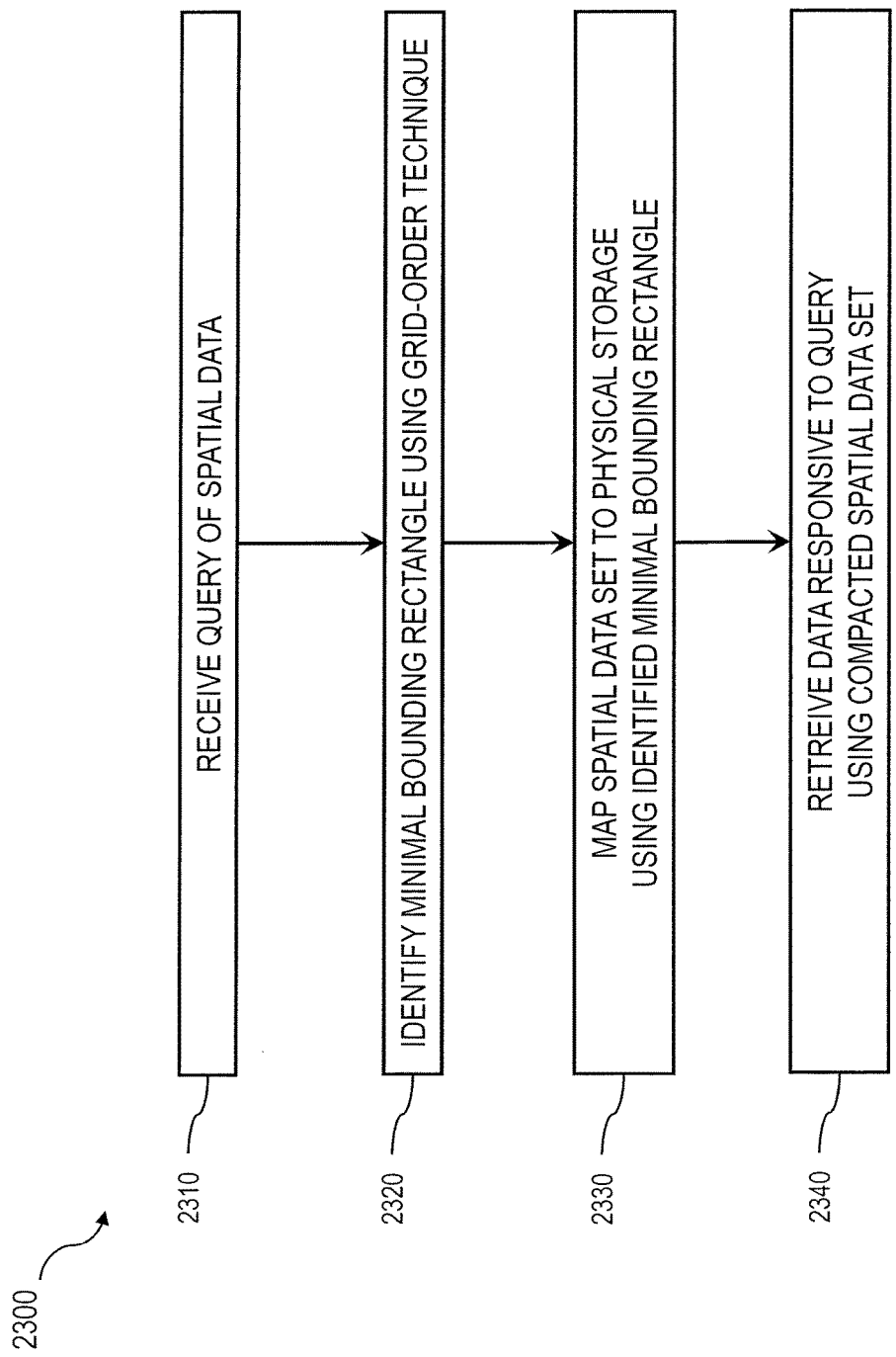
FIG. 23 is a process flow diagram illustrating query handling using a grid-order technique.

FIG. 23 is a diagram 2300 illustrating a method in which, at 2310, a query of spatial data is received by a database comprising a columnar data store storing data in a column-oriented structure. Thereafter, at 2320, a minimal bounding rectangle associated with the query is identified using a grid order scan technique. A spatial data set corresponding to the query is then mapped, at 2330, using the identified minimal bounding rectangle, to physical storage in the database. Next, at 2340, the spatial data set is then retrieved.

Figure 24:
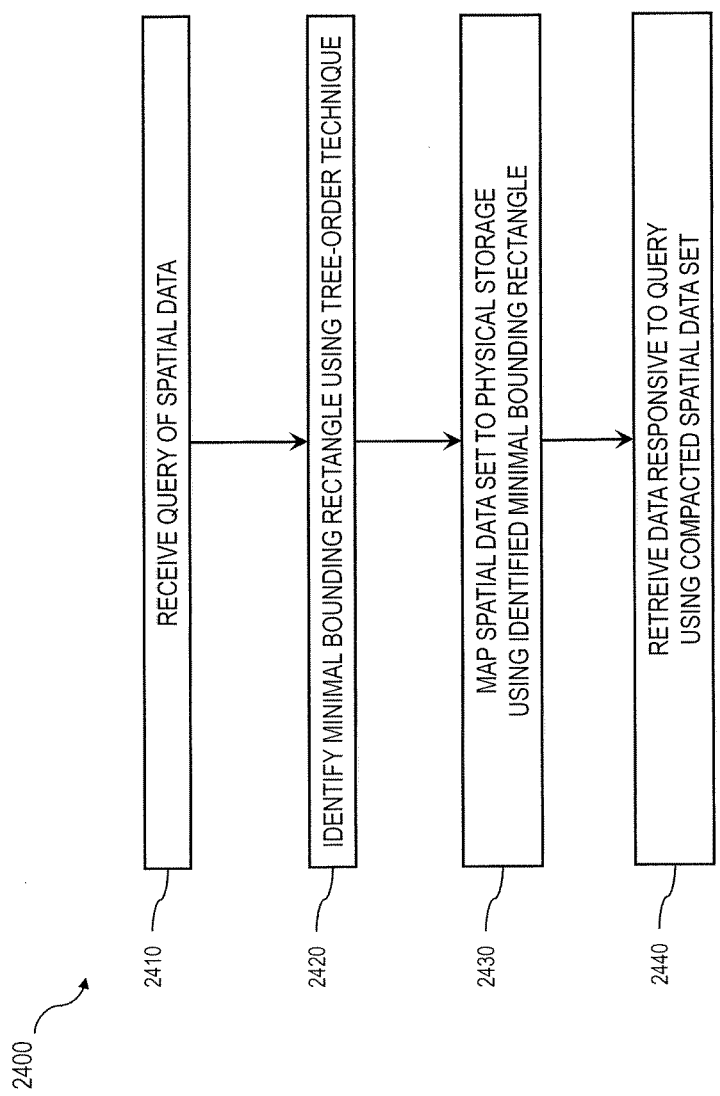
FIG. 24 is a process flow diagram illustrating query handling using a tree-order technique.

FIG. 24 is a diagram 2400 illustrating a method in which, at 2410, a query of spatial data is received by a database comprising a columnar data store storing data in a column-oriented structure. Thereafter, at 2420, a minimal bounding rectangle associated with the query is identified using a tree order scan technique. A spatial data set corresponding to the query is then mapped, at 2430, using the identified minimal bounding rectangle, to physical storage in the database. Next, at 2440, the spatial data set is then retrieved.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method implemented on one or more systems comprising one or more programmable processors, the method comprising:

mapping spatial data stored in a database comprising a columnar data store storing the spatial data in a column-oriented structure, the mapping comprising preserving spatial proximity of a plurality of spatial point objects when the spatial data are physically stored using a grid ordering comprising:

dividing a bounded space containing the spatial point objects into a grid having fixed boundaries and comprising rectangular cells, indexing the cells of the grid, wherein the indexing comprises defining a minimum bounding box for each spatial point object of the plurality of spatial point objects, the minimum bounding box enclosing the spatial point object, storing a grid-identifier to at least one cell of the grid for each minimum bounding box, and creating index vectors to represent the cells of the grid and the grid identifiers of the minimum bounding boxes, and assigning any minimum bounding boxes having a size above a certain level to an overflow cell;

identifying a target minimum bounding box based on a received query of the spatial data, the identifying comprising scanning the cells of the grid and the exclusive ordering values using the index vectors;

determining, based on the mapping and the identified target minimum bounding box, a spatial data set corresponding to the received query and a physical storage location in the database from which to retrieve the spatial data set, the determining further comprising checking the overflow cell for the received query; and retrieving the spatial data set from the physical storage location based on the determining.

2. A method as in claim 1, wherein the grid ordering comprises the grid of cells being of uniform length along each axis of a plurality of axes.

3. A method as in claim 2, wherein the indexing of the cells of the grid comprises indexing the cells with a space-filling curve.

4. A method as in claim 3, wherein the space-filling curve comprises a Hilbert space-filling curve.

5. A method as in claim 2, further comprising redundantly storing a reference to each minimum bounding box for every cell the minimum bounding box intersects.

6. A method as in claim 2, further comprising storing a reference to each minimum bounding box only for a cell at which a corner of the minimum bounding box is inside.

7. A method as in claim 6, wherein a parameter defines a number of adjacent cells per dimension extending from the corner.

8. A method as in claim 1, wherein the size is based on a number of adjacent cells per dimension that the minimum bounding box can intersect.

9. A method as in claim 1, wherein the grid ordering comprises the grid of cells having non-uniform dimensions.

10. A non-transitory computer program product storing instructions which, when executed by at least one data processor forming part of at least one computing system, result in operations comprising:

mapping spatial data stored in a database comprising a columnar data store storing the spatial data in a column-oriented structure, the mapping comprising preserving spatial proximity of a plurality of spatial point objects when the spatial data are physically stored using a grid ordering comprising:

dividing a bounded space containing the spatial point objects into a grid having fixed boundaries and comprising rectangular cells, indexing the cells of the grid, wherein the indexing comprises defining a minimum bounding box for each spatial point object of the plurality of spatial point objects, the minimum bounding box enclosing the spatial point object, storing a grid-identifier to at least one cell of the grid for each minimum bounding box, and creating index vectors to represent the cells of the grid and the grid identifiers of the minimum bounding boxes, and assigning any minimum bounding boxes having a size above a certain level to an overflow cell;

identifying a target minimum bounding box based on a received query of the spatial data, the identifying comprising scanning the cells of the grid and the exclusive ordering values using the index vectors;

determining, based on the mapping and the identified target minimum bounding box, a spatial data set corresponding to the received query and a physical storage location in the database from which to retrieve the spatial data set, the determining further comprising checking the overflow cell for the received query; and retrieving the spatial data set from the physical storage location based on the determining.

11. A computer program product as in claim 10, wherein the grid ordering comprises the grid of cells being of uniform length along each axis of a plurality of axes.

12. A computer program product as in claim 11, wherein the indexing of the cells of the grid comprises indexing the cells with a space-filling curve.

13. A computer program product as in claim 12, wherein the space-filling curve comprises a Hilbert space-filling curve.

14. A computer program product as in claim 11, wherein the operations further comprise redundantly storing a reference to each minimum bounding box for every cell the minimum bounding box intersects.

15. A computer program product as in claim 11, wherein the operations further comprise a reference to each minimum bounding box only for a cell at which a corner of the minimum bounding box is inside.

16. A computer program product as in claim 15, wherein a parameter defines a number of adjacent cells per dimension extending from the corner.

17. A computer program product as in claim 15, wherein the operations further comprise any minimum bounding boxes having a size above a certain level to an overflow cell.

18. A system comprising:

a database comprising a columnar data store storing data in a column-oriented structure;

at least one data processor; and memory storing instructions which, when executed by the at least one data processor, result in operations comprising:

mapping spatial data stored in a database comprising a columnar data store storing the spatial data in a column-oriented structure, the mapping comprising preserving spatial proximity of a plurality of spatial point objects when the spatial data are physically stored using a grid ordering comprising:

dividing a bounded space containing the spatial point objects into a grid having fixed boundaries and comprising rectangular cells, indexing the cells of the grid, wherein the indexing comprises defining a minimum bounding box for each spatial point object of the plurality of spatial point objects, the minimum bounding box enclosing the spatial point object, storing a grid-identifier to at least one cell of the grid for each minimum bounding box, and creating index vectors to represent the cells of the grid and the grid identifiers of the minimum bounding boxes, and assigning any minimum bounding boxes having a size above a certain level to an overflow cell;

identifying a target minimum bounding box based on a received query of the spatial data, the identifying comprising scanning the cells of the grid and the exclusive ordering values using the index vectors;

determining, based on the mapping and the identified target minimum bounding box, a spatial data set corresponding to the received query and a physical storage location in the database from which to retrieve the spatial data set, the determining further comprising checking the overflow cell for the received query; and retrieving the spatial data set from the physical storage location based on the determining.

* * * * *